US010738212B2

(12) United States Patent
Virkar et al.

(10) Patent No.: US 10,738,212 B2
(45) Date of Patent: Aug. 11, 2020

(54) PROPERTY ENHANCING FILLERS FOR TRANSPARENT COATINGS AND TRANSPARENT CONDUCTIVE FILMS

(71) Applicant: C3Nano Inc., Hayward, CA (US)

(72) Inventors: Ajay Virkar, San Mateo, CA (US); Faraz Azadi Manzour, Berkeley, CA (US); Xiqiang Yang, Hayward, CA (US); Hua Gu, Dublin, CA (US)

(73) Assignee: C3Nano Inc., Hayward, CA (US)

( * ) Notice: Subject to any disclaimer, the term of this patent is extended or adjusted under 35 U.S.C. 154(b) by 0 days.

(21) Appl. No.: 15/889,594

(22) Filed: Feb. 6, 2018

(65) Prior Publication Data

US 2018/0179410 A1    Jun. 28, 2018

Related U.S. Application Data

(62) Division of application No. 14/577,669, filed on Dec. 19, 2014.
(Continued)

(51) Int. Cl.
*G02B 1/14* (2015.01)
*C08L 3/04* (2006.01)
(Continued)

(52) U.S. Cl.
CPC .............. *C09D 101/02* (2013.01); *C08K 3/04* (2013.01); *C09D 101/10* (2013.01);
(Continued)

(58) Field of Classification Search
CPC .................................. C08K 3/04; G02B 1/14
See application file for complete search history.

(56) References Cited

U.S. PATENT DOCUMENTS 4,348,462 A    9/1982  Chung
4,623,676 A    11/1986 Kistner
(Continued)

FOREIGN PATENT DOCUMENTS

CN    102054540 A    5/2011
CN    102250506 A    11/2011
(Continued)

OTHER PUBLICATIONS

Behler et al., "Nanodiamond-Polymer Composite Fibers and Coatings," ACS Nano, (2009), 3(2):363-369.
(Continued)

*Primary Examiner* — Laura A Auer
(74) *Attorney, Agent, or Firm* — Christensen, Fonder, Dardi & Herbert PLLC; Peter S. Dardi

(57) ABSTRACT

Optically transparent films can comprise a coating of nanodiamonds to introduce desirable properties, such as hardness, good thermal conductivity and an increased dielectric constant. In general, transparent conductive films can be formed with desirable property enhancing nanoparticles included in a transparent conductive layer and/or in a coating layer. Property enhancing nanoparticles can be formed from materials having a large hardness parameter, a large thermal conductivity and/or a large dielectric constant. Suitable polymers are incorporated as a binder in the layers with the property enhancing nanoparticles. The coatings with property enhancing nanoparticles can be solution coated and corresponding solutions are described.

18 Claims, 4 Drawing Sheets

Related U.S. Application Data

(60) Provisional application No. 62/059,376, filed on Oct. 3, 14.

(51) Int. Cl.

| | | |
|---|---|---|
| *C09D 101/10* | (2006.01) | |
| *C09D 101/18* | (2006.01) | |
| *C09D 101/26* | (2006.01) | |
| *C09D 133/08* | (2006.01) | |
| *C09D 133/14* | (2006.01) | |
| *C09D 163/00* | (2006.01) | |
| *C09D 101/02* | (2006.01) | |
| *C08K 3/04* | (2006.01) | |
| *G02B 1/16* | (2015.01) | |

(52) U.S. Cl.
CPC ......... *C09D 101/18* (2013.01); *C09D 101/26* (2013.01); *C09D 133/14* (2013.01); *C09D 163/00* (2013.01); *G02B 1/14* (2015.01); *G02B 1/16* (2015.01)

(56) References Cited

U.S. PATENT DOCUMENTS

| | | | |
|---|---|---|---|
| 5,059,502 A | 10/1991 | Kojima et al. | |
| 5,916,955 A | 6/1999 | Vereschagin et al. | |
| 7,384,680 B2 | 6/2008 | Bi et al. | |
| 8,031,180 B2 | 10/2011 | Miyamoto et al. | |
| 8,049,333 B2 | 11/2011 | Alden et al. | |
| 8,475,879 B1 | 7/2013 | Borjanovic et al. | |
| 8,748,749 B2 | 6/2014 | Srinivas et al. | |
| 9,183,968 B1 | 11/2015 | Li et al. | |
| 2002/0090507 A1 | 7/2002 | Barth et al. | |
| 2003/0194561 A1 | 10/2003 | Bier et al. | |
| 2005/0266235 A1 | 12/2005 | Nakajima et al. | |
| 2007/0074316 A1 | 3/2007 | Alden et al. | |
| 2009/0208719 A1 | 8/2009 | Kang et al. | |
| 2009/0297828 A1 | 12/2009 | Shenderova et al. | |
| 2010/0062189 A1 | 3/2010 | Yosomiya et al. | |
| 2011/0094651 A1* | 4/2011 | Kuriki ............... H01L 31/02246 156/51 |
| 2011/0094777 A1 | 4/2011 | Swift et al. | |
| 2011/0232199 A1 | 9/2011 | Yao | |
| 2011/0285019 A1 | 11/2011 | Alden et al. | |
| 2012/0027924 A1 | 2/2012 | Castellano | |
| 2012/0073947 A1 | 3/2012 | Sakata et al. | |
| 2012/0219838 A1 | 8/2012 | Terada et al. | |
| 2013/0056244 A1 | 3/2013 | Srinivas et al. | |
| 2013/0180181 A1 | 7/2013 | Nixon et al. | |
| 2013/0341074 A1 | 12/2013 | Virkar et al. | |
| 2013/0342221 A1 | 12/2013 | Virkar et al. | |
| 2014/0086776 A1 | 3/2014 | Park et al. | |
| 2014/0202735 A1 | 7/2014 | Inaba et al. | |
| 2014/0238833 A1 | 8/2014 | Virkar et al. | |
| 2015/0017386 A1* | 1/2015 | Kolb ..................... C08J 7/047 428/149 |
| 2015/0144380 A1 | 5/2015 | Yang et al. | |
| 2016/0233825 A1* | 8/2016 | Bertelo ................ C09D 7/61 |

FOREIGN PATENT DOCUMENTS

| | | | |
|---|---|---|---|
| JP | 2009-505358 A | 2/2009 | |
| JP | 2011-204649 A | 10/2011 | |
| JP | 2012-035537 A | 2/2012 | |
| WO | 2007-022226 A2 | 2/2007 | |
| WO | WO-2013025614 A1 * | 2/2013 | ............ C08K 9/04 |
| WO | 2013-038067 A1 | 3/2013 | |
| WO | 2013-135305 A1 | 9/2013 | |
| WO | 2014-174150 A1 | 10/2014 | |

OTHER PUBLICATIONS

Khalinezhad et al., "Effect of nanodiamond surface functionalization using oleylamine on the scratch behavior of polyacrylidnanodiamond nanocomposite," Diamond & Related Materials, (2014), vol. 45, pp. 7-11.

Mochalin et al., "Covalent Incorporation of Aminated Nanodiamond into an Epoxy Polymer Network," ACS Nano, (2011), 5(9):7494-7502.

Mochalin et al., "The properties and applications of nanodiamonds," Nature Nanotechnology, (2012), vol. 7, pp. 11-23.

Petrova et al., "Applied Study on Mechanics of Nanocomposites with Carbon Nanofillers," Journal of Theoretical and Applied Mechanics, (2013), 43(3):67-76.

International Search Report and Written Opinion from the corresponding PCT International Application No. PCT/US2015/053681 dated Jan. 29, 2016 (12 pages).

Taiwan Office Action from corresponding Taiwan Patent Application No. 104132624 dated Aug. 19, 2016.

"Principle Properties of Diamond," http://www.chm.bris.ac.uk/motm/diamond/diamprop.htm, accessed Jan. 11, 2017.

Chinese Office Action from corresponding Chinese Patent Application No. 201580060974.1 dated Nov. 2, 2018.

Office Action from corresponding Chinese Patent Application No. 201580060974.1 dated Aug. 13, 2019.

Office Action from corresponding Japanese Patent Application No. 2017-517776 dated Sep. 3, 2019.

\* cited by examiner

PROPERTY ENHANCING FILLERS FOR TRANSPARENT COATINGS AND TRANSPARENT CONDUCTIVE FILMS

CROSS REFERENCE TO RELATED APPLICATIONS

This application is a divisional of U.S. patent application Ser. No. 14/577,669 to Virkar et al., filed on Dec. 19, 2014, entitled "Property Enhancing Fillers for Transparent Coatings and Transparent Conductive Films," which claims priority to U.S. provisional patent application Ser. No. 62/059,376, filed Oct. 3, 2014 to Virkar et al., entitled "Property Enhancing Fillers for Coatings and Transparent Conductive Films," both of which are incorporated herein by reference.

FIELD OF THE INVENTION

The invention is related to thin polymer films loaded with property enhancing nanoparticles, such as nanoparticles contributing to hardness and abrasion resistance, thermal conductivity and/or a high dielectric constant. The invention further relates to transparent conductive films incorporating a thin polymer layer loaded with property enhancing nanoparticles, which may or may not be in a layer providing the electrical conductivity and/or a coating layer associated with the transparent conductive layer. The invention also relates to transparent polymer-based films comprising nanodiamonds. In addition, the invention relates to coating solutions that comprise dissolved polymers, dispersed property enhancing nanoparticles, other optional compositions, such as processing aids or stabilization compositions, and optional metal nanowires.

BACKGROUND OF THE INVENTION

Transparent polymer films are used in a wide range of products. While the films can serve many purposes, generally the films provide some protection from various mechanical and/or environmental assaults. Protection provided by the film can be directed both to underlying structure as well as the film itself since, for example, a scratched surface of the film can degrade the desired performance of the film by decreasing transparency and increasing blurring or haze. Protection of surfaces can be significant both in use of the ultimate product as well as during processing to form the product and transporting components for assembly into the product.

Functional films can provide important roles in a range of contexts. For example, electrically conductive films can be important for the dissipation of static electricity when static can be undesirable or dangerous. Optical films can be used to provide various functions, such as polarization, anti-reflection, phase shifting, brightness enhancement or other functions. High quality displays can comprise one or more optical coatings.

Transparent conductors can be used for several optoelectronic applications including, for example, touch-screens, liquid crystal displays (LCD), flat panel display, organic light emitting diode (OLED), solar cells and smart windows. Historically, indium tin oxide (ITO) has been the material of choice due to its relatively high transparency at high conductivities. There are however several shortcomings with ITO. For example, ITO is a brittle ceramic which needs to be deposited using sputtering, a fabrication process that involves high temperatures and vacuum and therefore can be relatively slow. Additionally, ITO is known to crack easily on flexible substrates.

SUMMARY OF THE INVENTION

In a first aspect, the invention pertains to an optical structure comprising a transparent substrate and a coating comprising a polymer binder and nanodiamonds.

In a further aspect, the invention pertains to a transparent conductive film comprising a transparent substrate, a transparent electrically conductive layer and a protective coating comprising a polymer binder and nanoparticles. In some embodiments, the nanoparticles have an average primary particle diameter of no more than about 100 nm and are formed of a material having a bulk Vickers Hardness of at least about 1650 HV, a high thermal conductivity material selected from the group consisting of diamond, graphene, silicon nitride, boron nitride, aluminum nitride, gallium arsenide, indium phosphide or a mixture thereof and/or a high dielectric constant material selected from the group consisting of barium titanate, strontium titanate, lead titanate, lead zirconium titanate, calcium copper titanate and mixtures thereof.

In additional aspects, the invention pertains to a transparent conductive film comprising a transparent substrate and a transparent electrically conductive layer comprising a polymer binder, a sparse metal conductive element and nanoparticles. In some embodiments, the nanoparticles can have an average primary particle size of no more than about 100 nm and can be formed of a material having a bulk Vickers Hardness of at least about 1650 HV, a high thermal conductivity material selected from the group consisting of diamond, graphene, silicon nitride, boron nitride, aluminum nitride, gallium arsenide, indium phosphide or a mixture thereof and/or a high dielectric constant material selected from the group consisting of barium titanate, strontium titanate, lead titanate, lead zirconium titanate, calcium copper titanate and mixtures thereof.

In other aspects, the invention pertains to an optical structure comprising a transparent substrate and a transparent coating. The transparent coating can comprise a polymer binder and from about 0.05 weight percent to about 30 weight percent nanoparticles with an average primary particle diameter of no more than about 100 nm, and can have a pencil hardness of at least about 1 grade greater than the pencil hardness of the transparent coat without the filler and a decrease in total transmission of visible light due to the transparent hard coat of no more than about 5%. Moreover, the invention pertains to a solution comprising a solvent, a curable polymer binder and nanoparticles. The nanoparticles can have an average primary particle diameter of no more than about 100 nm and can comprise a material having a bulk Vickers Hardness of at least about 1650 HV, a high thermal conductivity material having a bulk thermal conductivity of at least about 30 W/(m·K), a high dielectric constant material selected from the group consisting of barium titanate, strontium titanate, lead titanate, lead zirconium titanate, calcium copper titanate and mixtures thereof, or a mixture thereof.

DETAILED DESCRIPTION OF THE INVENTION

Figure 1:
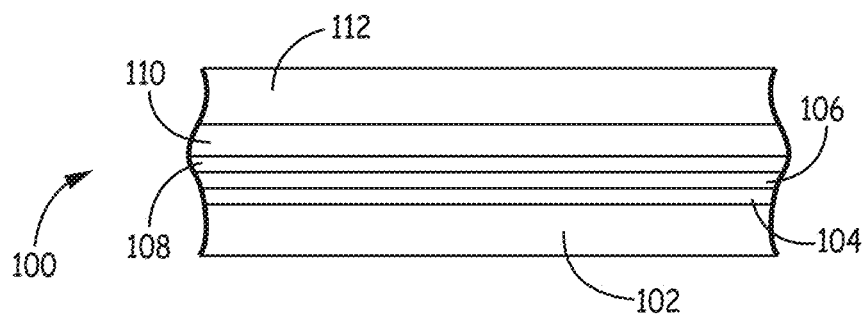
FIG. 1 is a fragmentary side view of a film with a sparse metal conductive layer and various additional transparent layers on either side of the sparse metal conductive layer.

Transparent coatings have been developed with polymer matrices with property enhancing nanoparticle fillers to provide desired properties for the coatings, such as increased hardness and/or greater thermal conductivity, in a thin coating with good optical transparency. Suitable fillers for the polymer matrices include, for example, nanodiamonds that can provide desirable hardness, increased dielectric constant, and thermal conductivity to a coating formed with the nanodiamonds without decreasing the optical transparency by an undesirable amount. Other appropriate nanoparticles or combinations thereof can be similarly incorporated into the polymer matrix. The nanoparticles for use as fillers can be formed from materials that have a high bulk hardness value and/or a high bulk thermal conductivity and/or a high bulk dielectric constant. In some embodiments, the coatings formed from the particle loaded polymer can have a thickness of no more than about 5 microns. The enhanced coatings can be formed through a solution coating process in which the matrix polymer is dissolved in a solvent and the nanoparticles are dispersed in the solution. The coatings can be suitable for protection of transparent electrically conductive layers, although other transparent coating applications can make effective use of the enhanced coatings described herein. In particular, transparent conductive layers can be formed from metal nanowires. In additional or alternative embodiments, the desirable fillers can be added directly to a conductive ink used to form a sparse metal conductive element with a corresponding increase in hardness and other property improvements following the coating with a polymer overcoat. The protective coatings can be useful to reduce damage from scratching, environmental assaults, such as dilute acids and bases, reduce thermal damage, decrease vulnerability from high voltages and/or provide other valuable protection.

As described herein, the enhanced loaded coatings can be formed with a modest drop in total transmission of visible light. Various polymer matrices can be introduced for the coatings with relatively good mechanical strength to provide a good high transparency base for further enhancement. Generally, the coatings can be formed with small thicknesses, and the enhanced mechanical properties can be effective to mechanically stabilize the coatings even with the small thicknesses. In some embodiments, small thicknesses can be desirable for use adjacent transparent conductive layers since electrical conductivity can be maintained through the thin overcoats. Thus, with coatings having average thicknesses of no more than about 25 microns and in some embodiments no more than a micron, and generally at least about 50 nm thick, significant mechanical stability can be obtained. Furthermore, thermal conductivity properties of the enhanced coatings can be desirable to dissipate heat so that damage from heating can be reduced. Improved thermal conductivity can provide other desirable uses for specific applications. A coating with a high dielectric filler can be useful to protect sparse metal conductive layers from damage from high voltage.

Good coating properties generally involve the formation of a good dispersion of the nanoparticle fillers within a solution of the matrix polymer so that the resulting coating has reduced effects of particle clumps. The nanoparticle fillers generally have an average primary particle diameter of no more than about 100 nm so that the particles can be incorporated into a relatively smooth thin coating and so that the particles do not alter the optical properties more than desired. In general, the coatings have a nanoparticle loading of no more than about 70 weight percent. The concentrations of polymer binder and filler particles in a coating solution can be adjusted to yield desirable coating properties for the solution, such as viscosity, and thickness of the final coating. The ratio of concentration of solids in the coating solution can be adjusted to yield the coating concentrations desired once the coating is dried. The polymer component of the coating generally can be crosslinked with UV radiation or other means appropriate for the polymer binder to further strengthen the coating.

In general, the property enhancing nanoparticle fillers can be introduced into a passive protective coating and/or directly into a transparent conductive layer. Passive transparent protective coatings may or may not be used to cover a transparent conductive layer. A common feature for these coatings is the compatibility of the components in a coating solution as well as in the resulting composite material. Compatibility refers to the ability to effectively disperse into a relatively uniform material without an unacceptable degree of aggregation of the components, such as with clumping. In particular, the compatibility can allow for good distribution of the materials within the coating solutions to provide for formation of a reasonably uniform composite material forming the coating. A more uniform composite material is believed to contribute to desirable optical properties of the coating, such as good transparency and low haze.

For the passive coatings, the coating solutions can comprise a solvent, dissolved matrix polymer, nanoparticles with selected properties, possible combinations thereof and optional additional components. A range of matrix polymers can be used that are suitable for transparent films, as described below. Wetting agents, such as surfactants, can be used as well as other processing aids. In general, the solvents can comprise water, organic solvents or suitable mixtures thereof. For the active coatings, the coating solutions generally further comprise components that contribute to the active functionality, such as metal nanowires for contributing electrical conductivity. Examples of both types of coatings are described below in the Examples. For use as an overcoat for a metal nanowire based transparent conductive layers, it has been found that stabilizers introduced into the overcoat can stabilize the electrical conductivity of the transparent conductive layer. The stabilizers are consistent with maintaining good transparency and process compatibility for the coating solutions, and are described further below.

With respect to desirable fillers, nanodiamonds are of particular interest due to desirable properties that can be introduced consistent with maintaining good optical transparency and relatively low haze. Diamond is a crystalline form of carbon with $sp^3$ hybridized orbitals, in contrast with graphitic carbon, amorphous carbon and other forms of carbon. Commercial nanodiamonds generally can have a core of crystalline diamond carbon with a shell of amorphous and/or graphitic carbon, and are dielectrics. The surface chemistry of the nanodiamonds can reflect the synthesis approach and possibly additional processing. Commercial nanodiamonds, which can be functionalized or unfunctionalized following purification, are available from various suppliers as listed below. Nanodiamond share with macroscopic diamonds very high values of hardness and thermal conductivity, and these properties can be used to deliver desirable properties to transparent coatings incorporating nanodiamonds.

Nanodiamonds are commercially available with average primary particle diameters generally no more than about 50 nm and in some embodiments no more than about 10 nm, although nanodiamonds may be useful in some embodiments with average primary particle diameters of no more than about 100 nm. As used herein unless indicated otherwise, particle diameters are an average of values along the principle axes of the particle, which can be roughly estimated from transmission electron micrographs. Commercial nanodiamonds are produced synthetically with possible surface modification, and their overall structure can be confirmed using spectroscopic techniques. Surface modification of the nanodiamonds can be useful for processing of the nanodiamonds and for compatibility with particular solvents and binders. As described in the examples below, the commercial nanodiamonds can be well dispersed in a range of solvents for the production of high quality optical coatings with good transparency and low haze. Other nanoparticle fillers can have average particle diameters over the same ranges as the nanodiamonds. The nanoparticles can have roughly spherical shapes or other convenient shapes. A person of ordinary skill in the art will recognize that additional ranges within the explicit average particle diameter ranges above for nanodiamonds or other property enhancing nanoparticles are contemplated and are within the present disclosure.

The nanodiamonds can provide a desirable degree of hardness and thermal conductivity to a composite coating incorporating the nanodiamonds. Also, diamonds are a good dielectric so that a nanodiamond composite coatings can facilitate dissipation of strong electric fields that can damage films in the structure. Other nanoparticles can be similarly introduced to provide similar properties to composites incorporating the functional nanoparticles consistent with good optical transparency of a resulting coating. For the formation of transparent conductive films, other suitable nanoparticles for providing hardness include but not limited to, for example, boron nitride, $B_4C$, cubic-$BC_2N$, silicon carbide, crystalline alpha-aluminum oxide (sapphire), or the like. Hardness contributing nanoparticles can be formed from a bulk material having a Vickers hardness of at least about 1650 $kgf/mm^2$ (16.18 GPa).

With respect to thermal conductivity, in addition to nanodiamonds, graphene, silicon nitride, boron nitride, aluminum nitride, gallium arsenide, indium phosphide and mixtures thereof can be suitable for introducing high thermal conductivity. In some embodiments, high thermal conductivity materials can have a thermal conductivity of at least about 30 W/(m·K), and graphene and diamond have among the highest thermal conductivities known. Particularly high dielectric constant materials that can be introduced as nanoparticles include but not limited to, for example, barium titanate, strontium titanate, lead titanate, lead zirconium titanate, calcium copper titanate and mixtures thereof. With respect to the hardness of the protective polymer based coatings, hardness can be measured with the pencil hardness test for films, as described further below. Scratch resistance is also evaluated with the use of steel wool in the Examples below.

The coatings are generally formed by solution coating. The nanoparticles, such as the nanodiamonds, can be dispersed and then the dispersion of nanoparticles can be blended with the coating solution of the polymer binder, although processing orders may be suitable depending on the selection of solvent and the dispersion properties of the particles. The nanoparticles in the coating solution can have a concentration in the ranges from about 0.005 wt % to about 5.0wt %, in further embodiments from about 0.0075 wt % to about 1.5 wt % and in additional embodiments from about 0.01 wt % to about 1.0 wt %. A person of ordinary skill in the art will recognize that additional ranges of concentrations within the explicit ranges above are contemplated and are within the present disclosure.

Transparent electrically conductive elements, e.g., films, of particular interest herein comprise a sparse metal conductive layer. The conductive layers are generally sparse to provide desired amount of optical transparency, so the coverage of the metal has very significant gaps over the layer of the conductive element. For example, transparent electrically conductive films can comprise metal nanowires deposited along a layer where sufficient contact can be provided for percolation to provide suitable conduction pathways. In other embodiments, the transparent electrically conductive film can comprise a fused metal nanostructured network, which has been found to exhibit desirable electrical and optical properties. Conductivity referenced herein refers to electrical conductivity unless specifically indicated otherwise.

The loaded polymer films described herein can provide desirable properties generally for transparent optical films and in particular for protection of sparse metal conductive elements in transparent conductive films. The thicknesses of the film can be selected thin enough that good electrical conductivity can take place through the films. The hardness of the films can make the structure resistant to scratching and deformation and high thermal conductivity can facilitate removal of heat to limit potential damage of a sparse metal conductive element due to heat. Sparse metal conductive elements, regardless of the specific structures, are vulnerable to environmental assaults.

In general, various sparse metal conductive layers can be formed from metal nanowires. Films formed with metal nanowires that are processed to flatten the nanowires at junctions to improve conductivity is described in U.S. Pat. No. 8,049,333 to Alden et al., entitled "Transparent Conductors Comprising Metal Nanowires," incorporated herein by references. Structures comprising surface embedded metal nanowires to increase metal conductivity are described in U.S. Pat. No. 8,748,749 to Srinivas et al., entitled "Patterned Transparent Conductors and Related Manufacturing Methods," incorporated herein by reference. However, desirable properties have been found for fused metal nanostructured networks with respect to high electrical conductivity and desirable optical properties with respect to transparency and low haze. Fusing of adjacent metal nanowires can be performed based on chemical processes under commercially appropriate processing conditions.

Metal nanowires can be formed from a range of metals, and metal nanowires are available commercially. While metal nanowires are inherently electrically conducting, the vast majority of resistance in the metal nanowires based films is believed to due to the junctions between nanowires. Depending on processing conditions and nanowire properties, the sheet resistance of a relatively transparent nanowire film, as deposited, can be very large, such as in the giga-ohms/sq range or even higher. Various approaches have been proposed to reduce the electrical resistance of the nanowire films without destroying the optical transparency. Low temperature chemical fusing to form a metal nanostructured network has been found to be very effective at lowering the electrical resistance while maintaining the optical transparency.

In particular, a significant advance with respect to achieving electrically conductive films based on metal nanowires has been the discovery of well controllable processes to form a fused metal network where adjacent sections of the metal nanowires fuse. Fusing of metal nanowires with various fusing sources is described further in published U.S. patent applications 2013/0341074 to Virkar et al., entitled "Metal Nanowire Networks and Transparent Conductive Material," and 2013/0342221 to Virkar et al. (the '221 application), entitled "Metal Nanostructured Networks and Transparent Conductive Material," 2014/0238833 to Virkar et al. (the '833 application), entitled "Fused Metal Nanostructured Networks, Fusing Solutions With Reducing Agents and Methods for Forming Metal Networks," and copending U.S. patent application Ser. No. 14/087,669, now published U.S. patent application 2015/0144380 to Yang et al. (the '380 application), entitled "Transparent Conductive Coatings Based on Metal Nanowires, Solution Processing Thereof, and Patterning Approaches," U.S. patent application Ser. No. 14/448,504, now U.S. Pat. No. 9,183,968 to Li et al, entitled "Metal Nanowire Inks for the Formation of Transparent Conductive Films With Fused Networks," all of which are incorporated herein by reference.

The transparent conductive films generally comprise several components or layers that contribute to the processability and/or the mechanical properties of the structure without detrimentally altering the optical properties. The sparse metal conductive layers can be designed to have desirable optical properties when incorporated into the transparent conductive films. The sparse metal conductive layer may or may not further comprise a polymer binder. Unless otherwise indicated, references to thicknesses refer to average thicknesses over the referenced layer or film, and adjacent layers may intertwine at their boundaries depending on the particular materials. In some embodiments, the total film structure can have a total transmission of visible light of at least about 85%, a haze of no more than about 2 percent and a sheet resistance after formation of no more than about 250 ohms/sq, although significantly better performance is described herein.

For incorporation into transparent coatings for transparent conductive films or directly into the ink for the formation of a sparse metal conductive layer, the loaded overcoats generally do not increase the sheet resistance significantly, and in some embodiments the sheet resistance increases relative to the sheet resistance of corresponding unloaded films by no more than about 20%, in further embodiments, no more than about 15% and in additional embodiments, no more than about 10%. For general optical applications, the overcoat can decrease the total transmittance of visible light relative to the value of total transmission in percent of a corresponding unloaded film by no more than about 5, in further embodiments no more than about 3, in additional embodiments no more than about 2 and in other embodiments no more than about 1. Also, it can be desirable for the haze to not increase by a large amount with the filler in the coating. In some embodiments, the haze value can increase relative to the haze value of a corresponding unloaded film by no more than about 0.5, in further embodiments by no more than about 0.4 and in additional embodiments no more than about 0.3 in units of haze generally reported as a percent. In some embodiments, haze may decrease. A person of ordinary skill in the art will recognize that additional ranges of sheet resistance increase, total transmittance change and haze change within the explicit ranges above are contemplated and are within the present disclosure. A reference unloaded film is produced with the coating solution that has the same concentrations of other components in the solvent and is processed the same way so that the final thickness may be slightly different.

It has been found that very effective stabilization of the sparse metal conductive layer can be achieved through the appropriate design of the overall structure. In particular, a stabilization composition can be placed in a layer adjacent the sparse metal conductive element, which can be an overcoat layer or an undercoat layer. Furthermore, an optically clear adhesive, e.g. as a component of the film, can be used to provide for attaching the transparent conductive film to a device, and the selection of the optically clear adhesive has been found to significantly facilitate obtaining a desired degree of stabilization. In particular, optically clear adhesives can comprise a double sided adhesive layers on a carrier layer. The carrier layer can be a polyester, such as PET or a commercial barrier layer material, which may provide a desirable moisture and gas barrier to protect the sparse metal conductive layers, although Applicant does not want to be limited by a theory of operation of particular optically clear adhesives.

Transparent, electrically conductive films find important applications, for example in solar cells and touch screens. Transparent conductive films formed from metal nanowire components offer the promise of lower processing cost and more adaptable physical properties relative to traditional materials. In a multilayered film with various structural polymer layer(s), the resulting film structure has been found to be robust with respect to processing while maintaining desirable electrical conductivity, and the incorporation of desirable components as described herein can additionally provide stabilization without degrading the functional properties of the film so that devices incorporating the films can have suitable lifetimes in normal use.

Transparent Coatings and Films

The transparent coatings with nanoparticle loaded polymers described herein are generally coated onto a transparent substrate for incorporation into a desired structure. General structures are described, and specific applications for transparent conductive films are found in the following section. In general, a precursor solution for the transparent filled coatings can be deposited using appropriate coating methods onto a transparent substrate to form a transparent structure. In some alternatively or additionally an integral optical component, such as a light emitting device or a light receiving device. The discussion focuses on a simple passive transparent substrate and other structures follow accordingly.

In general, any reasonable transparent substrate can be suitable. Thus, suitable substrates can be formed, for example, from inorganic glasses, such as silicate glasses, transparent polymer films, inorganic crystals or the like. In some embodiments, the substrate is a polymer film. Suitable polymers for a substrate include, for example, polyethylene terephthalate (PET), polyethylene naphthalate (PEN), polyacrylate, poly(methyl methacrylate), polyolefin, polyvinyl chloride, fluoropolymers, polyamide, polyimide, polysulfone, polysiloxane, polyetheretherketone, polynorbornene, polyester, polystyrene, polyurethane, polyvinyl alcohol, polyvinyl acetate, acrylonitrile-butadiene-styrene copolymer, cyclic olefin polymer, cyclic olefin copolymer, polycarbonate, copolymers thereof or blend thereof or the like. Fluoropolymers include, for example, polyvinylfluoride, polyvinylidenefluoride, polytetrafluoroethylene, hexafluoropropylene, perfluoropropylvinylether, perfluoromethylvinylether, polychlorotrifluoroethylene, and the like. Polymer films for some embodiments can have a thickness from about 5 microns to about 5 mm, in further embodiments, from about 10 microns to about 2 mm and in additional embodiment from about 15 microns to about 1 mm. A person of ordinary skill in the art will recognize that additional ranges of thicknesses within the explicit ranges above are contemplated and are within the present disclosure. Substrates can comprise a plurality of layers distinguished by composition and/or other properties. More specific ranges of materials suitable for substrates for transparent conductive films are presented below, and the general substrate ranges would include these specific materials and properties. Suitable polymers for the coatings can include, for example, radiation curable polymers and/or heat curable polymers, such as polyurethanes, acrylic resins, acrylic copolymers, cellulose ethers and esters, other structural polysaccharides, polyethers, polyesters, epoxy containing polymers, copolymers thereof, and mixtures thereof.

The transparent coating with property enhancing nanoparticle filler generally can have a thickness of no more than about 25 microns, in further embodiments from about 20 nanometers (nm) to about 10 microns, in other embodiments from about 35 nm to about 5 microns, and in additional embodiments from about 50 nm to about 2 microns. The transparent coatings formed from the nanoparticle loaded polymers can comprise from about 0.01 weight percent (wt %) to about 70 wt % property enhancing nanoparticles, in further embodiments from about 0.05 wt % to about 60 wt %, in other embodiments from about 0.1 wt % to about 50 wt %, and in additional embodiments from about 0.2 wt % to about 40 wt % property enhancing nanoparticles. The transparent coatings can further comprise polymer binder, optional property modifiers, such as crosslinking agents, wetting agents, viscosity modifiers, and/or stabilizers, such as antioxidants and/or UV stabilizers, for transparent conductive films, and optionally a sparse metal conductive layer. A person of ordinary skill in the art will recognize that additional ranges of thickness and nanoparticle concentrations in the loaded polymers within the explicit ranges above are contemplated and are within the present disclosure.

With respect to property enhancing nanoparticles, nanodiamonds present desirable properties in particular with respect to hardness and thermal conductivity as well as to some degree dielectric constant. Bulk diamonds have among the greatest values of known materials with respect to both hardness and thermal conductivity. However, additional materials provide desirable values for these properties. For convenience, the material properties are referenced to the corresponding bulk materials since the values for the nanoparticles may be less available, although the nanoparticle properties generally directly reflect roughly the bulk properties. The material of the property enhancing nanoparticles is generally either inorganic materials or carbon materials with a majority of the material being elemental carbon, which are known, for example, in fullerenes, 3-dimensional crystals (diamond), 2-dimensional crystals (graphitic carbon), amorphous forms (e.g., carbon blacks), and the like. The nanoparticle can have surface modifications, including organic surface modifications, without altering identification of the nanoparticles according to the majority core material.

For the materials of relevance, the hardness of the bulk materials can be referenced to a Vickers hardness measurement. Vickers hardness is a measure of indenting the material. Vickers hardness can be measured with accepted standards, which include ASTM E384 and ISO 6507-1-2005, both of which are incorporated herein by reference. Vickers hardness is tabulated for many materials of interest. Vickers hardness is generally reported in units of HV (Vickers pyramid number, kg-force/mm$^2$), although it may be reported in units of Pascal even though it is not actually a pressure. In some embodiments, the bulk material corresponding to the nanoparticles can have a Vickers Hardness of at least about 1650 HV, in some embodiments at least about 1750 HV and in additional embodiments at least about 1800 HV. In addition to nanodiamonds, additional hard materials for the property enhancing nanoparticles include, for example, boron nitride, B4C, cubic-BC$_2$N, silicon carbide, tungsten carbide, aluminum boride, crystalline alpha-aluminum oxide (sapphire), or the like.

With respect to high thermal conductivity materials, suitable materials can have bulk thermal conductivities of at least about 30 W/(m·K), in further embodiments at least about 35 W/(m·K), and in some embodiments at least about 50 W/(m·K). A person of ordinary skill in the art will recognize that additional ranges of thermal conductivity within the explicit ranges above are contemplated and are within the present disclosure. Suitable high thermal conductivity materials, apart from nanodiamonds, include, for example, many elemental metals (unionized elemental form) and metal alloys, graphene, silicon nitride, boron nitride, aluminum nitride, gallium arsenide, indium phosphide, aluminum oxide, and mixtures thereof. With respect to high dielectric constant, various titanates have high dielectric constants, such as barium titanate, strontium titanate, lead titanate, lead zirconium titanate, calcium copper titanate and mixtures thereof.

Relevant nanoparticles are generally available commercially. Nanoparticles sources include, for example, US Research Nanomaterials, Inc. (Texas, USA), which sells many of the materials of interest, BYK-Chemie GMbH. (Germany), Sigma-Aldrich (Missouri, USA), Nanostructured and Amorphous Materials (Texas, USA), Sky Spring Nano Materials Inc. (Texas, USA) and Nanophase Technologies Corp. (Romeoville, Ill., USA). Also, laser pyrolysis techniques have been developed for the synthesis of a wide range of dispersible nanoparticles, as described in U.S. Pat. No. 7,384,680 to Bi et al., entitled "Nanoparticle-Based Powder Coatings and Corresponding Structures," incorporated herein by reference.

Nanodiamonds, or diamond nanoparticles, can be generally natural nanodiamonds or synthetic nanodiamonds, and a nanodiamond particle can comprise a crystalline nanodiamond core surrounded by a shell of graphitic and/or amorphous carbon. The surface of the nanodiamond may be formed due to the particular synthesis approach as well as optional post synthesis processing, such as surface functionalization. For commercial applications, suitable diamond nanoparticles are generally synthetic nanodiamonds, which are available commercially. The surface of a nanodiamond may be functionalized to influence the chemical properties of the nanodiamonds, such as the dispersability and/or compatibility with a particular polymer binder. The average diameter of nanodiamond particles generally can be no more than about 100 nm, in further embodiments from about 2 nm to about 75 nm and in additional embodiments from about 2.5 nm to about 50 nm. A person of ordinary skill in the art will recognize that additional ranges of nanodiamond average diameters within the explicit ranges above are contemplated and are within the present disclosure.

Synthetic nanodiamonds can be produced by several means. For example, vapor phase formation such as chemical vapor deposition, ion irradiation of graphite, chlorination of carbides, and techniques using shock wave energies are some of the several possible methods to produce such diamond particles or thin nanodiamond films. In addition to diamond nanoparticles of rough spherical form, other 1- and 2-dimensional nanodiamond structures had been fabricated such as nanodiamond rods, sheets, flakes, and the like, which can also be used in UV protecting compositions (on methods of synthesis of these structures see O. Shenderova and G. McGuire, "Types of Nanodiamonds,", book chapter in "Ultrananocrystalline diamond: Synthesis, Properties and Applications", Editors: O. Shenderova, D. Gruen, William-Andrews Publisher, 2006), incorporated herein by reference). Commercial nanodiamond particles are generally formed by controlled explosive techniques, such as described in U.S. Pat. No. 5,916,955 to Vereschagin et al., entitled "Diamond-Carbon Material and Method for Producing Thereof," incorporated herein by reference. Improved purification methods for detonation nanodiamonds are described, for example, in published PCT application, WO 2013/135305 to Dolmatov et al., entitled "Detonation Nanodiamond Material Purification Method and Product Thereof," incorporated herein by reference. Commercial nanodiamonds with various surface chemistries or dispersed in ranges of solvents are available from NanoCarbon Research Institute Co., Ltd. (Japan), PlasmaChem (Germany), Carbodeon Limited OY (Finland), NEOMOND (Korea), Sigma-Aldrich (USA), and Ray Techniques Ltd. (Israel).

The nanodiamond particles each generally comprise a mechanically stable, chemically inert crystalline core and a surface generally considered relatively chemically active. By functionalizing the nanodiamond particle surface with targeted species, the nanodiamond can be provided with modified chemical and/or physical properties. Functionalization can be done by various chemical, photochemical, and electrochemical methods to graft different organic functionalities onto the nanodiamond. Depending on the desired physical property and application of the nanodiamond, functionalized nanodiamond materials can be fluorinated, chlorinated, carboxylated, aminated, hydroxylated, hydrogenated, sulfonated or a mixture thereof. See, for example, published U.S. patent application 2011/0232199 to Yao, entitled "Process for Production of Dispersion of Fluorinated Nano Diamond," and (carboxylated nanodiamonds) published PCT application WO 2014/174150 to Myllyaki et al., entitled "A Method for Producing Zeta Negative Nanodiamond Dispersion and Zeta Negative Nanodiamond Dispersion," incorporated herein by reference. The functionalization and/or purification can be used to help to remove and/or break up nanoparticle agglomerates. In general, commercial nanodiamonds are sufficiently unagglomerated for processing into relatively uniform thin films as described herein. The pH of the solutions, concentration, solvent and other dispersion properties can be adjusted to further assist with dispersing the nanodiamonds. For example, carboxylated nanodiamonds are generally stably dispersed in higher pH solutions, and hydrogenated and aminated nanodiamonds are generally stably dispersed in lower pH solutions.

Hardness of the loaded polymer films can be measured with the pencil hardness test for films based on ASTM D3363. Following pencil sharpening methodology, a constant downward applied force is used while holding the pencil at a 45° angle. A Pencil hardness Kit was used for the measurements with 500 grams or 750 grams. Hardness was determined by analyzing the effect of different pencils in the graphite grading scale on the base conductive layer. If no damage was done to the base layer, the film was considered to have passed. The film was checked under a Leica microscope at a 20× magnification. The hardness scales range with grade values from 9B to 9H, with higher values of B corresponding to lower values of hardness and larger values of H corresponding to increased hardness, and a value of F connects the B and H ranges and the lowest "B" value is HB followed by B, 2B, . . . , 9B. In some embodiments, the coating with the property enhancing nanoparticles can have a pencil hardness of at least one grade greater hardness, in some embodiments at least bout 2 grades greater, and in further embodiments at least about 3 grades greater pencil hardness relative to an equivalent coating in all other respects except without the property enhancing nanoparticles. Other scales and tests for hardness are available, and qualitatively similar trends should follow. Scratch resistance is also evaluated with the use of steel wool rubbed against the surface with a 100 g weight, as described further in the Examples below. Superfine steel wool was used to scratch the film by rubbing the surface after the transparent overcoat is applied.

The transparent loaded coatings can be formed by coating a precursor solution using appropriate coating methods. Property enhancing nanoparticles and/or stabilization compositions can be incorporated into a suitable solvent selected to deposit the coating with appropriate compatibility. Suitable solvents generally include, for example, water, alcohols, ketones, esters, ethers, such as glycol ethers, aromatic compounds, alkanes, and the like and mixtures thereof.

Specific solvents include, for example, water, ethanol, isopropyl alcohol, isobutyl alcohol, tertiary butyl alcohol, methyl ethyl ketone, methyl isobutyl ketone, cyclic ketones such as cylcopentanone and cyclohexanone, glycol ethers, toluene, hexane, ethyl acetate, butyl acetate, ethyl lactate, propylene carbonate, dimethyl carbonate, PGMEA (2-methoxy-1-methylethylacetate), N,N-dimethylformamide, N,N-dimethylacetamide, acetonitrile, formic acid, or mixtures thereof.

In general, the polymer for the coating, generally a crosslinkable polymer, can be supplied as a commercial coating composition or formulated with selected polymer compositions. Suitable classes of radiation curable polymers and/or heat curable polymers include, for example, polysiloxanes, polysilsesquioxanes, polyurethanes, acrylic resins, acrylic copolymers, cellulose ethers and esters, nitrocellulose, other water insoluble structural polysaccharides, polyethers, polyesters, polystyrene, polyimide, fluoropolymer, styrene-acrylate copolymers, styrene-butadiene copolymers, acrylonitrile butadiene styrene copolymers, polysulfides, epoxy containing polymers, copolymers thereof, and mixtures thereof. Suitable commercial coating compositions include, for example, coating solutions from Dexerials Corporation (Japan), POSS® Coatings from Hybrid Plastics, Inc. (Mississippi, USA), silica filled siloxane coatings from California Hardcoating Company (California, USA), CrystalCoat UV-curable coatings from SDC Technologies, Inc. (California, USA). The polymer concentrations and correspondingly the concentrations of other non-volatile agents can be selected to achieve desired rheology of the coating solution, such as an appropriate viscosity for the selected coating process. Solvent can be added or removed to adjust total solid concentrations. Relative amounts of solids can be selected to adjust the composition of the finished coating composition, and the total amounts of solids can be adjusted to achieve a desired thickness of the dried coating. Generally, the coating solution can have a polymer concentration from about 0.025 wt % to about 50 wt %, in further embodiments from about 0.05 wt % to about 25 wt % and in additional embodiments from about 0.075 wt % to about 20 wt %. A person of ordinary skill in the art will recognize that additional ranges of polymer concentrations within the specific ranges above are contemplated and are within the present disclosure.

Property enhancing nanoparticles can be incorporated into the coating solution for forming a coating layer. A coating precursor solution can comprise from about 0.005 wt % to about 5 wt % nanoparticles, in further embodiments from about 0.01 wt % to about 3 wt % and in additional embodiments from about 0.025 wt % to about 2 wt % property enhancing nanoparticles. A person of ordinary skill in the art will recognize that additional ranges of property enhancing nanoparticles in a coating solution within the explicit ranges above are contemplated and are within the present disclosure. Additional additives, such as wetting agents, viscosity modifiers, dispersing aids, and the like can be added as desired.

The transparent coating with property enhancing nanoparticles in some embodiments can cause a decrease of the total transmittance of visible light relative to a corresponding coating without the property enhancing nanoparticles by no more than about 5 percentage points, in further embodiments no more than about 3 and in additional embodiments no more than about 1.5 percentage points. Also, the transparent coating with property enhancing nanoparticles can cause an increase of the haze in some embodiments relative to corresponding unloaded coatings by no more than about 1.5 percentage points, in further embodiments by no more than about 1, and in additional embodiments by no more than about 0.6 percentage points. A person of ordinary skill in the art will recognize that additional ranges of modifications of optical properties due to loaded polymer coatings within the explicit ranges above are contemplated and are within the present disclosure. The corresponding unloaded coatings have the same concentrations in the solvent of components other than the absent nanoparticles and is processed the same way so that the final thickness of the coating may be slightly different for the corresponding coating.

For the deposition of the coating precursor solutions, any reasonable deposition approach can be used, such as dip coating, spray coating, knife edge coating, bar coating, Meyer-rod coating, slot-die coating, gravure printing, spin coating or the like. The deposition approach directs the amount of liquid deposited, and the concentration of the solution can be adjusted to provide the desired thickness of product coating on the surface. After forming the coating with the dispersion, the coating can be dried to remove the liquid and crosslinked appropriately.

Transparent Conductive Films

The transparent electrically conductive structures or films generally comprise a sparse metal conductive layer that provides the electrical conductivity without significantly adversely altering the optical properties and various additional layers that provide mechanical support as well as protection of the conductive element. Generally, a polymer overcoat is placed over the sparse metal conductive layer. The property enhancing nanoparticles as described herein can be placed in an overcoat layer, an optional undercoat layer and/or directly into the sparse metal conductive layer. The sparse metal conductive layer is very thin and correspondingly susceptible to damage by mechanical and other abuses. The property enhancing nanoparticles can provide some types of protection, and stabilization compounds, as described in the previous section, as well as other elements of the films can provide additional protections. With respect to sensitivities to environmental damage, it has been found that an undercoat and/or overcoat can comprise a stabilization composition that can provide desirable protection, and certain classes of optically clear adhesives and/or barrier layers can also provide valuable protection from light, heat, chemicals and other environmental damage. While the focus herein is on environmental assaults from humid air, heat and light, polymer sheets used to protect the conductive layers from these environmental assaults can also provide protection from contact and the like.

Thus, the sparse metal conductive layer can be formed on a substrate that can have one or more layers in the structure of the substrate. The substrate generally can be identified as a self supporting film or sheet structure. A thin solution processed layer, referred to as an undercoat, can be optionally placed along the top surface of the substrate film and immediately under the sparse metal conductive layer. Also, the sparse metal conductive can be coated with additional layers that provide some protection on the side of the sparse metal conductive layer opposite the substrate. In general, the electrically conductive structure can be placed in either orientation in the final product, i.e., with the substrate facing outward to the substrate against the surface of the product supporting the electrically conductive structure. In some embodiments, a plurality of coatings, i.e., undercoats and overcoats, can be applied, and each layer can have selected additives for corresponding property enhancement.

Referring to FIG. 1, representative transparent conductive film 100 comprises a substrate 102, undercoat layer 104, sparse metal conductive layer 106, overcoat layer 108, optically clear adhesive layer 110 and protective surface layer 112, although not all embodiments include all layers. In particular, rolls of transparent conductive film can be distributed with the overcoat as the top layer for later processing that may or may not involve subsequent addition of additional over-layers. In these embodiments, having a mechanically hard overcoat can be desirable in terms of reducing risk of damage to the electrically conductive film. A transparent conductive film generally comprises a sparse metal conductive layer and at least one layer on each side of the sparse metal conductive layer. The total thickness of the transparent conductive film can have in some embodiments a thickness from 5 microns to about 3 millimeters (mm), in further embodiments from about 10 microns to about 2.5mm and in other embodiments from about 15 microns to about 1.5 mm. A person of ordinary skill in the art will recognize that additional ranges of thicknesses within the explicit ranges above are contemplated and are within the present disclosure. In some embodiments, the length and width of the film as produced can be selected to be appropriate for a specific application so that the film can be directly introduced for further processing into a product. In additional or alternative embodiments, a width of the film can be selected for a specific application, while the length of the film can be long with the expectation that the film can be cut to a desired length for use. For example, the film can be in long sheets or a roll. Similarly, in some embodiments, the film can be on a roll or in another large standard format and elements of the film can be cut according to a desired length and width for use.

Substrate 102 generally comprises a durable support layer formed from an appropriate polymer or polymers. In some embodiments, the substrate can have a thickness from about 10 microns to about 1.5 mm, in further embodiments from about 15 microns to about 1.25 mm and in additional embodiments from about 20 microns to about 1 mm. A person of ordinary skill in the art will recognize that additional ranges of thicknesses of the substrate within the explicit ranges above are contemplated and are within the present disclosure. Suitable optically clear polymers with very good transparency, low haze and good protective abilities can be used for the substrate. Suitable polymers include, for example, polyethylene terephthalate (PET), polyethylene naphthalate (PEN), polyacrylate, poly(methyl methacrylate), polyolefin, polyvinyl chloride, fluoropolymers, polyamide, polyimide, polysulfone, polysiloxane, polyetheretherketone, polynorbornene, polyester, polystyrene, polyurethane, polyvinyl alcohol, polyvinyl acetate, acrylonitrile-butadiene-styrene copolymer, cyclic olefin polymer, cyclic olefin copolymer, polycarbonate, copolymers thereof or blend thereof or the like. Suitable commercial polycarbonate substrates include, for example, MAK-ROFOL SR243 1-1 CG, commercially available from Bayer Material Science; TAP® Plastic, commercially available from TAP Plastics; and LEXAN™ 8010CDE, commercially available from SABIC Innovative Plastics. Protective surface layer 112 can independently have a thickness and composition covering the same thickness ranges and composition ranges as the substrate as described in this paragraph above.

Optional undercoat 104 and/or optional overcoat 108, independently selectable for inclusion, can be placed respectively under or over sparse metal conductive layer 106. Optional coatings 104, 108 can comprise a curable polymer, e.g., heat curable or radiation curable polymers. Suitable polymers for coatings 104, 108 are described below as binders for inclusion in the metal nanowire inks, and the list of polymers, corresponding cross linking agents and additives apply equally to optional coatings 104, 108 without repeating the discussion explicitly here. Coatings 104, 108 can have a thickness from about 25 nm to about 2 microns, in further embodiments from about 40 nm to about 1.5 microns and in additional embodiments from about 50 nm to about 1 micron. A person of ordinary skill in the art will recognize that additional ranges of overcoat thickness within the explicit ranges above are contemplated and are within the present disclosure. In general, the thinness of overcoat 108 allows for electrical conduction through overcoat 108 so that electrical connection can be made to sparse metal conductive layer 106, although in some embodiments, an overcoat can comprise sublayers in which electrical conductivity is provided through some but not necessarily all of the sublayers.

Optional optically clear adhesive layer 110 can have a thickness from about 10 microns to about 300 microns, in further embodiments from about 15 microns to about 250 microns and in other embodiments from about 20 microns to about 200 microns. A person of ordinary skill in the art will recognize that additional ranges of thicknesses of optically clear adhesive layers within the explicit ranges above are contemplated and are within the present disclosure. Suitable optically clear adhesives can be contact adhesives. Optically clear adhesives include, for example, coatable compositions and adhesive tapes. UV curable liquid optically clear adhesives are available based on acrylic or polysiloxane chemistries. Suitable adhesive tapes are available commercially, for example, from Lintec Corporation (MO series); Saint Gobain Performance Plastics (DF713 series); Nitto Americas (Nitto Denko) (LUCIACS CS9621T and LUCIAS CS9622T); DIC Corporation (DAITAC LT series OCA, DAITAC WS series OCA and DAITAC ZB series); PANAC Plastic Film Company (PANACLEAN series); Minnesota Mining and Manufacturing (3M, Minnesota U.S.A.—product numbers 8146, 8171, 8172, 8173 and similar products) and Adhesive Research (for example product 8932).

The amount of nanowires delivered onto the substrate for sparse metal conductive layer 106 can involve a balance of factors to achieve desired amounts of transparency and electrical conductivity. While thickness of the nanowire network can in principle be evaluated using scanning electron microscopy, the network can be relatively sparse to provide for optical transparency, which can complicate the measurement. In general, the sparse metal conductive element, e.g., fused metal nanowire network, would have an average thickness of no more than about 5 microns, in further embodiments no more than about 2 microns and in other embodiments from about 10 nm to about 500 nm. However, the sparse metal conductive elements are generally relatively open structures with significant surface texture on a submicron scale. The loading levels of the nanowires can provide a useful parameter of the network that can be readily evaluated, and the loading value provides an alternative parameter related to thickness. Thus, as used herein, loading levels of nanowires onto the substrate is generally presented as milligrams of nanowires for a square meter of substrate. In general, the metal conductive networks, whether or not fused, can have a loading from about 0.1 milligrams (mg)/m$^2$ to about 300 mg/m$^2$, in further embodiments from about 0.5 mg/m$^2$ to about 200 mg/m$^2$, and in other embodiments from about 1 mg/m$^2$ to about 150 mg/m$^2$. The transparent conductive layer can comprise from about 0.5 wt % to about 70 wt % metal, in other embodiments from about 0.75 wt % to about 60 wt % and in further embodiments from about 1 wt % to about 50 wt % metal in a conductive network. A person of ordinary skill in the art will recognize that additional ranges of thickness and metal loading within the explicit ranges above are contemplated and are within the present disclosure. If the sparse metal conductive layer is patterned, the thickness and loading discussion applies only to the regions where metal is not excluded or significantly diminished by the patterning process. The sparse metal conductive layer can comprise property enhancing nanoparticles in addition to a polymer binder and other processing aids and the like. Ranges of concentration of property enhancing nanoparticles described above for loadings in transparent polymer layers generally also apply to sparse metal conductive layers.

Generally, within the total thicknesses above for particular components of film 100, layers 102, 104, 106, 108, 110, 112 can be subdivided into sublayers, for example, with different compositions from other sublayers. For example, an overcoat layer can comprise sublayers with different property enhancing components. In some embodiments, a top overcoat sublayer may comprise high dielectric nanoparticles, that may inhibit electrical conduction through the layer. Then an electrical connection can be established through a window, metal tab or the like penetrating top sublayer of overcoat 108 without necessarily penetrating an overcoat sublayer, which may comprise for example, nanodiamonds and/or a stabilization composition. Also, multiple layer optically clear adhesives are discussed above. Thus, more complex layer stacks can be formed. Sublayers may or may not be processed similarly to other sublayers within a particular layer, for example, one sublayer can be laminated while another sublayer can be coated and cured.

Stabilization compositions can be placed in appropriate layers to stabilize the sparse metal conductive layers. For embodiments in which the sparse metal conductive layers comprise fused nanostructured metal networks, the sparse metal conductive layer itself as formed may not comprise a stabilization compound since the presence of such compounds may inhibit the chemical fusing process. In alternative embodiments, it may be acceptable to include the stabilization agents in coating solutions for forming the sparse metal conductive layer. Similarly, stabilization compounds can be included in an optically clear adhesive composition. However, it has been found that the stabilization compounds can be included effectively in a coating layer, which can correspondingly be made relatively thin while still providing effective stabilization. Specific descriptions of coatings with stabilization compositions are described in the previous section. Since the layers with the stabilization compositions can be thin, desirable stabilization can be obtained with low totals of stabilization agents, which can be desirable from a processing perspective as well as having a low effect on the optical properties.

For some applications, it is desirable to pattern the electrically conductive portions of the film to introduce desired functionality, such as distinct regions of a touch sensor. Patterning can be performed by changing the metal loading on the substrate surface either by printing metal nanowires at selected locations with other locations being effectively barren of metal or to etch or otherwise ablate metal from selected locations either before and/or after fusing the nanowires. However, it has been discovered that high contrast in electrical conductivity can be achieved between fused and unfused portions of a layer with essentially equivalent metal loading so that patterning can be performed by selectively fusing the metal nanowires. This ability to pattern based on fusing provides significant additional patterning options based on selective fusing of the nanowires, for example, through the selective delivery of a fusing solution or vapor. Patterning based on selective fusing of metal nanowires is described in the '833 application and the '380 application above.

Figure 2:
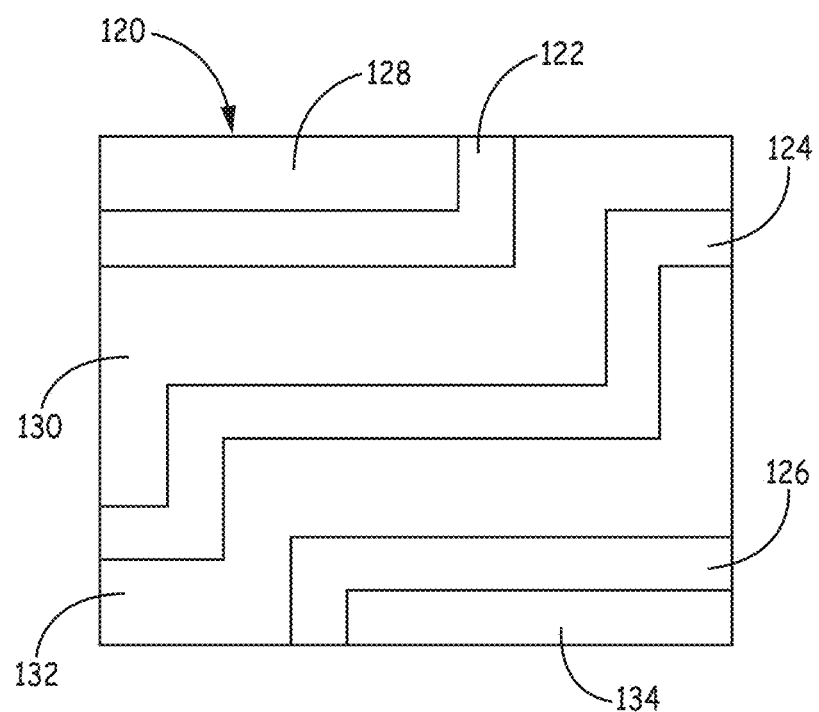
FIG. 2 is a top view of a representative schematic patterned structure with three electrically conductive pathways formed with sparse metal conductive layers.

As a schematic example, a fused metal nanostructured network can form conductive patterns along a substrate surface 120 with a plurality of electrically conductive pathways 122, 124, and 126 surrounded by electrically resistive regions 128, 130, 132, 134, as shown in FIG. 2. As shown in FIG. 2, the fused area corresponds with three distinct electrically conductive regions corresponding with electrically conductive pathways 122, 124, and 126. Although three independently connected conductive regions have been illustrated in FIG. 2, it is understood that patterns with two, four or more than 4 conductive independent conductive pathways or regions can be formed as desired. For many commercial applications, fairly intricate patterns can be formed with a large number of elements. In particular, with available patterning technology adapted for the patterning of the films described herein, very fine patterns can be formed with highly resolved features. Similarly, the shapes of the particular conductive regions can be selected as desired.

The transparent conductive film is generally built up around the sparse metal conductive element which is deposited to form the functional feature of the film. Various layers are coated, laminated or otherwise added to the structure using appropriate film processing approaches. As described herein, the nature of the layers can significantly alter the long term performance of the transparent conductive film. The deposit of the sparse metal conductive layer is described further below in the context of a fused metal nanostructured layers, but un-fused metal nanowire coatings can be similarly deposited except that the fusing components are absent.

The sparse metal conductive layer generally is solution coated onto a substrate, which may or may not have a coating layer on top of the substrate that then forms an undercoat adjacent the sparse metal conductive layer. An overcoat can be solution coated onto the sparse metal conductive layer in some embodiments. Crosslinking, with application of UV light, heat or other radiation, can be performed to crosslink polymer binders in the coating layers and/or the sparse metal conductive layer, which can be performed in one step or multiple steps.

Sparse Metal Conductive Layers

Sparse metal conductive layers are generally formed from metal nanowires. With sufficient loading and selected nanowire properties, reasonable electrical conductivity can be achieved with the nanowires with corresponding appropriate optical properties. It is expected that the stabilized film structures described herein can yield desirable performance for films with various sparse metal conductive structures. However, particularly desirable properties have been achieved with fused metal nanostructured networks.

As summarized above, several practical approaches have been developed to accomplish the metal nanowire fusing. The metal loading can be balanced to achieve desirable levels of electrical conductivity with good optical properties. In general, the metal nanowire processing can be accomplished through deposition of two inks with the first ink comprising the metal nanowires and the second ink comprising a fusing composition, or through the deposition of an ink that combines the fusing elements into the metal nanowire dispersion. The inks may or may not further comprise additional processing aids, binders or the like. Suitable patterning approaches can be selected to be suitable for the particular ink system.

In general, one or more solutions or inks for the formation of the metal nanostructured network can collectively comprise well dispersed metal nanowires, a fusing agent, and optional additional components, for example, a polymer binder, a cros slinking agent, a wetting agent, e.g., a surfactant, a thickener, a dispersant, other optional additives or combinations thereof. The solvent for the metal nanowire ink and/or the fusing solution if distinct from the nanowire ink can comprise an aqueous solvent, an organic solvent or mixtures thereof. In particular, suitable solvents include, for example, water, alcohols, ketones, esters, ethers, such as glycol ethers, aromatic compounds, alkanes, and the like and mixtures thereof. Specific solvents include, for example, water, ethanol, isopropyl alcohol, isobutyl alcohol, tertiary butyl alcohol, methyl ethyl ketone, glycol ethers, methyl isobutyl ketone, toluene, hexane, ethyl acetate, butyl acetate, ethyl lactate, PGMEA (2-methoxy-1-methylethylacetate), or mixtures thereof. While the solvent should be selected based on the ability to form a good dispersion of metal nanowires, the solvents should also be compatible with the other selected additives so that the additives are soluble in the solvent. For embodiments in which the fusing agent is included in a single solution with the metal nanowires, the solvent or a component thereof may or may not be a significant component of the fusing solution, such as alcohols and can be selected accordingly if desired.

The metal nanowire ink, in either a one ink or two ink configuration, can include from about 0.01 to about 1 weight percent metal nanowires, in further embodiments from about 0.02 to about 0.75 weight percent metal nanowires and in additional embodiments from about 0.04 to about 0.5 weight percent metal nanowires. A person of ordinary skill in the art will recognize that additional ranges of metal nanowire concentrations within the explicit ranges above are contemplated and are within the present disclosure. The concentration of metal nanowires influences the loading of metal on the substrate surface as well as the physical properties of the ink.

In general, the nanowires can be formed from a range of metals, such as silver, gold, indium, tin, iron, cobalt, platinum, palladium, nickel, cobalt, titanium, copper and alloys thereof, which can be desirable due to high electrical conductivity. Commercial metal nanowires are available from Sigma-Aldrich (Missouri, USA), Cangzhou Nano-Channel Material Co., Ltd. (China), Blue Nano (North Carolina, U.S.A.), EMFUTUR (Spain), Seashell Technologies (California, U.S.A.), Aiden (Korea), nanoComposix (U.S.A.), Nanopyxis (Korea), K&B (Korea), ACS Materials (China), KeChuang Advanced Materials (China), and Nanotrons (USA). Silver in particular provides excellent electrical conductivity, and commercial silver nanowires are available. Alternatively, silver nanowires can also be synthesized using a variety of known synthesis routes or variations thereof. To have good transparency and low haze, it is desirable for the nanowires to have a range of small diameters. In particular, it is desirable for the metal nanowires to have an average diameter of no more than about 250 nm, in further embodiments no more than about 150 nm, and in other embodiments from about 10 nm to about 120 nm. With respect to average length, nanowires with a longer length are expected to provide better electrical conductivity within a network. In general, the metal nanowires can have an average length of at least a micron, in further embodiments, at least 2.5 microns and in other embodiments from about 5 microns to about 100 microns, although improved synthesis techniques developed in the future may make longer nanowires possible. An aspect ratio can be specified as the ratio of the average length divided by the average diameter, and in some embodiments, the nanowires can have an aspect ratio of at least about 25, in further embodiments from about 50 to about 10,000 and in additional embodiments from about 100 to about 2000. A person of ordinary skill in the art will recognize that additional ranges of nanowire dimensions within the explicit ranges above are contemplated and are within the present disclosure.

Polymer binders and the solvents are generally selected consistently such that the polymer binder is soluble or dispersible in the solvent. In appropriate embodiments, the metal nanowire ink generally comprises from about 0.02 to about 5 weight percent binder, in further embodiments from about 0.05 to about 4 weight percent binder and in additional embodiments from about 0.1 to about 2.5 weight percent polymer binder. In some embodiments, the polymer binder comprises a crosslinkable organic polymer, such as a radiation crosslinkable organic polymer and/or a heat curable organic binder. To facilitate the crosslinking of the binder, the metal nanowire ink can comprise in some embodiments from about 0.0005 wt % to about 1 wt % of a crosslinking agent, in further embodiments from about 0.002 wt % to about 0.5 wt % and in additional embodiments from about 0.005 wt % to about 0.25 wt %. The nanowire ink can optionally comprise a rheology modifying agent or combinations thereof. In some embodiments, the ink can comprise a wetting agent or surfactant to lower the surface tension, and a wetting agent can be useful to improve coating properties. The wetting agent generally is soluble in the solvent. In some embodiments, the nanowire ink can comprise from about 0.01 weight percent to about 1 weight percent wetting agent, in further embodiments from about 0.02 to about 0.75 weight percent and in other embodiments from about 0.03 to about 0.6 weight percent wetting agent. A thickener can be used optionally as a rheology modifying agent to stabilize the dispersion and reduce or eliminate settling. In some embodiments, the nanowire ink can comprise optionally from about 0.05 to about 5 weight percent thickener, in further embodiments from about 0.075 to about 4 weight percent and in other embodiments from about 0.1 to about 3 weight percent thickener. A person of ordinary skill in the art will recognize that additional ranges of binder, wetting agent and thickening agent concentrations within the explicit ranges above are contemplated and are within the present disclosure.

A range of polymer binders can be suitable for dissolving/dispersing in a solvent for the metal nanowires, and suitable binders include polymers that have been developed for coating applications. Hard coat polymers, e.g., radiation curable coatings, are commercially available, for example as hard coat materials for a range of application, that can be selected for dissolving in aqueous or non-aqueous solvents. Suitable classes of radiation curable polymers and/or heat curable polymers include, for example, polysiloxanes, polysilsesquioxanes, polyurethanes, acrylic resins, acrylic copolymers, cellulose ethers and esters, nitrocellulose, other water insoluble structural polysaccharides, polyethers, polyesters, polystyrene, polyimide, fluoropolymer, styrene-acrylate copolymers, styrene-butadiene copolymers, acrylonitrile butadiene styrene copolymers, polysulfides, epoxy containing polymers, copolymers thereof, and mixtures thereof. Examples of commercial polymer binders include, for example, NEOCRYL® brand acrylic resin (DMS Neo-Resins), JONCRYL® brand acrylic copolymers (BASF Resins), ELVACITE® brand acrylic resin (Lucite International), SANCURE® brand urethanes (Lubrizol Advanced Materials), cellulose acetate butyrate polymers (CAB brands from Eastman™ Chemical), BAYHYDROL™ brand polyurethane dispersions (Bayer Material Science), UCECOAT® brand polyurethane dispersions (Cytec Industries, Inc.), MOWITOL® brand polyvinyl butyral (Kuraray America, Inc.), cellulose ethers, e.g., ethyl cellulose or hydroxypropyl methyl cellulose, other polysaccharide based polymers such as Chitosan and pectin, synthetic polymers like polyvinyl acetate, and the like. The polymer binders can be self-crosslinking upon exposure to radiation, and/or they can be crosslinked with a photoinitiator or other crosslinking agent. In some embodiments, photocrosslinkers may form radicals upon exposure to radiation, and the radicals then induce crosslinking reactions based on radical polymerization mechanisms. Suitable photoinitiators include, for example, commercially available products, such as IRGACURE® brand (BASF), GENOCURE™ brand (Rahn USA Corp.), and DOUBLECURE® brand (Double Bond Chemical Ind., Co, Ltd.), combinations thereof or the like.

Wetting agents can be used to improve the coatability of the metal nanowire inks as well as the quality of the metal nanowire dispersion. In particular, the wetting agents can lower the surface energy of the ink so that the ink spreads well onto a surface following coating. Wetting agents can be surfactants and/or dispersants. Surfactants are a class of materials that function to lower surface energy, and surfactants can improve solubility of materials. Surfactants generally have a hydrophilic portion of the molecule and a hydrophobic portion of the molecule that contributes to its properties. A wide range of surfactants, such as nonionic surfactants, cationic surfactant, anionic surfactants, zwitterionic surfactants, are commercially available. In some embodiments, if properties associated with surfactants are not an issue, non-surfactant wetting agents, e.g., dispersants, are also known in the art and can be effective to improve the wetting ability of the inks. Suitable commercial wetting agents include, for example, COATOSIL™ brand epoxy functionalized silane oligomers (Momentum Performance Materials), SILWET™ brand organosilicone surfactant (Momentum Performance Materials), THETAWET™ brand short chain non-ionic fluorosurfactants (ICT Industries, Inc.), ZETASPERSE® brand polymeric dispersants (Air Products Inc.), SOLSPERSE® brand polymeric dispersants (Lubrizol), XOANONS WE-D545 surfactant (Anhui Xoanons Chemical Co., Ltd), EFKA™ PU 4009 polymeric dispersant (BASF), MASURF FP-815 CP, MASURF FS-910 (Mason Chemicals), NOVEC™ FC-4430 and FC-4432 fluorinated surfactants (3M), mixtures thereof, and the like.

Thickeners can be used to improve the stability of the dispersion by reducing or eliminating settling of the solids from the metal nanowire inks. Thickeners may or may not significantly change the viscosity or other fluid properties of the ink. Suitable thickeners are commercially available and include, for example, CRAYVALLAC™ brand of modified urea such as LA-100 (Cray Valley Acrylics, USA), polyacrylamide, THIXOL™ 53L brand acrylic thickener, COAPUR™ 2025, COAPUR™ 830W, COAPUR™ 6050, COAPUR™ XS71 (Coatex, Inc.), BYK® brand of modified urea (BYK Additives), Acrysol DR 73, Acrysol RM-995, Acrysol RM-8W (Dow Coating Materials), Aquaflow NHS-300, Aquaflow XLS-530 hydrophobically modified polyether thickeners (Ashland Inc.), Borchi Gel L 75 N, Borchi Gel PW25 (OMG Borchers), and the like.

As noted above, the inks for depositing the sparse metal conductive layers can further comprise property enhancing nanoparticles. Suitable property enhancing nanoparticles include nanodiamonds as well as other property enhancing nanoparticle materials presented above which are specifically incorporated into the present discussion. Also, the ranges of nanoparticle sizes are summarized above in the context of coatings and are similarly incorporated here. The solution to form the sparse metal conductive layer can comprise from about 0.001 wt % to about 10 wt % nanoparticles, in further embodiments from about 0.002 wt % to about 7 wt % and in additional embodiments from about 0.005 to about 5 wt % property enhancing nanoparticles. A person of ordinary skill in the art will recognize that additional ranges of nanoparticle concentrations within the explicit ranges above are contemplated and are within the present disclosure.

Additional additives can be added to the metal nanowire ink, generally each in an amount of no more than about 5 weight percent, in further embodiments no more than about 2 weight percent and in further embodiments no more than about 1 weight percent. Other additives can include, for example, anti-oxidants, UV stabilizers, defoamers or anti-foaming agents, anti-settling agents, viscosity modifying agents, or the like.

As noted above, fusing of the metal nanowires can be accomplished through various agents. Without wanting to be limited by theory, the fusing agents are believed to mobilize metal ions, and the free energy seems to be lowered in the fusing process. Excessive metal migration or growth may lead in some embodiments to a degeneration of the optical properties, so desirable results can be achieved through a shift in equilibrium in a reasonably controlled way, generally for a short period of time, to generate sufficient fusing to obtain desired electrical conductivity while maintaining desired optical properties. In some embodiments, initiation of the fusing process can be controlled through a partial drying of the solutions to increase concentrations of the components, and quenching of the fusing process can be accomplished, for example, through rinsing or more completing drying of the metal layer. The fusing agent can be incorporated into a single ink along with the metal nanowires. The one ink solution can provide appropriate control of the fusing process.

In some embodiments, a process is used in which a sparse nanowire film is initially deposited and subsequent processing with or without depositing another ink provides for the fusing of the metal nanowires into a metal nanostructured network, which is electrically conducting. The fusing process can be performed with controlled exposure to a fusing vapor and/or through the deposition of a fusing agent in solution. Sparse metal conductive layers are generally formed on a selected substrate surface. The as-deposited nanowire film generally is dried to remove the solvent. Processing can be adapted for patterning of the film as described further below.

For the deposition of the metal nanowire ink, any reasonable deposition approach can be used, such as dip coating, spray coating, knife edge coating, bar coating, Meyer-rod coating, slot-die coating, gravure printing, spin coating or the like. The ink can have properties, such as viscosity, adjusted appropriately with additives for the desired deposition approach. Similarly, the deposition approach directs the amount of liquid deposited, and the concentration of the ink can be adjusted to provide the desired loading of metal nanowires on the surface. After forming the coating with the dispersion, the sparse metal conductive layer can be dried to remove the liquid.

The films can be dried, for example, with a heat gun, an oven, a thermal lamp or the like, although the films that can be air dried can be desired in some embodiments. In some embodiments, the films can be heated to temperatures from about 50° C. to about 150° C. during drying. After drying, the films can be washed one or more times, for example, with an alcohol or other solvent or solvent blend, such as ethanol or isopropyl alcohol, to remove excess solids to lower haze. Patterning can be achieved in several convenient ways. For example, printing of the metal nanowires can directly result in patterning. Additionally or alternatively, lithographic techniques can be used to remove portions of the metal nanowires, prior to or after fusing, to form a pattern.

Clear protective films covering the sparse metal conductive layer can be formed with holes or the like in appropriate locations to provide for electrical connections to the conductive layer. In general, various polymer film processing techniques and equipment can be used to the processing of these polymer sheets, and such equipment and techniques are well developed in the art, and future developed processing techniques and equipment can be correspondingly adapted for the materials herein.

Transparent Film Electrical and Optical Properties

The fused metal nanostructured networks can provide low electrical resistance while providing good optical properties. Thus, the films can be useful as transparent conductive electrodes or the like. The transparent conductive electrodes can be suitable for a range of applications such as electrodes along light receiving surfaces of solar cells. For displays and in particular for touch screens, the films can be patterned to provide electrically conductive patterns formed by the film. The substrate with the patterned film, generally has good optical properties at the respective portions of the pattern.

Electrical resistance of thin films can be expressed as a sheet resistance, which is reported in units of ohms per square ($\Omega/\square$ or ohms/sq) to distinguish the values from bulk electrical resistance values according to parameters related to the measurement process. Sheet resistance of films is generally measured using a four point probe measurement or another suitable process. In some embodiments, the fused metal nanowire networks can have a sheet resistance of no more than about 300 ohms/sq, in further embodiments no more than about 200 ohms/sq, in additional embodiments no more than about 100 ohms/sq and in other embodiments no more than about 60 ohms/sq. A person of ordinary skill in the art will recognize that additional ranges of sheet resistance within the explicit ranges above are contemplated and are within the present disclosure. Depending on the particular application, commercial specifications for sheet resistances for use in a device may not be necessarily directed to lower values of sheet resistance such as when additional cost may be involved, and current commercially relevant values may be for example, 270 ohms/sq, versus 150 ohms/sq, versus 100 ohms/sq, versus 50 ohms/sq, versus 40 ohms/sq, versus 30 ohms/sq or less as target values for different quality and/or size touch screens, and each of these values defines a range between the specific values as end points of the range, such as 270 ohms/sq to 150 ohms/sq, 270 ohms/sq to 100 ohms/sq, 150 ohms/sq to 100 ohms/sq and the like with 15 particular ranges being defined. Thus, lower cost films may be suitable for certain applications in exchange for modestly higher sheet resistance values. In general, sheet resistance can be reduced by increasing the loading of nanowires, but an increased loading may not be desirable from other perspectives, and metal loading is only one factor among many for achieving low values of sheet resistance.

For applications as transparent conductive films, it is desirable for the fused metal nanowire networks to maintain good optical transparency. In principle, optical transparency is inversely related to the loading with higher loadings leading to a reduction in transparency, although processing of the network can also significantly affect the transparency. Also, polymer binders and other additives can be selected to maintain good optical transparency. The optical transparency can be evaluated relative to the transmitted light through the substrate. For example, the transparency of the conductive film described herein can be measured by using a UV-Visible spectrophotometer and measuring the total transmission through the conductive film and support substrate. Transmittance is the ratio of the transmitted light intensity (I) to the incident light intensity ($I_0$). The transmittance through the film (Tfilm) can be estimated by dividing the total transmittance (T) measured by the transmittance through the support substrate ($T_{sub}$). (T=I/$I_o$ and T/$T_{sub}$=(I/$I_o$)/($I_{sub}$/$I_o$)=I/$I_{sub}$=$T_{film}$) Thus, the reported total transmissions can be corrected to remove the transmission through the substrate to obtain transmissions of the film alone. While it is generally desirable to have good optical transparency across the visible spectrum, for convenience, optical transmission can be reported at 550 nm wavelength of light. Alternatively or additionally, transmission can be reported as total transmittance from 400nm to 700 nm wavelength of light, and such results are reported in the Examples below. In general, for the fused metal nanowire films, the measurements of 550 nm transmittance and total transmittance from 400 nm to 700 nm (or just "total transmittance" for convenience) are not qualitatively different. In some embodiments, the film formed by the fused network has a total transmittance (TT %) of at least 80%, in further embodiments at least about 85%, in additional embodiments, at least about 90%, in other embodiments at least about 94% and in some embodiments from about 95% to about 99%. Transparency of the films on a transparent polymer substrate can be evaluated using the standard ASTM D1003 ("Standard Test Method for Haze and Luminous Transmittance of Transparent Plastics"), incorporated herein by reference. A person or ordinary skill in the art will recognize that additional ranges of transmittance within the explicit ranges above are contemplated and are within the present disclosure. When adjusting the measured optical properties for the films in the Examples below for the substrate, the films have very good transmission and haze values, which are achieved along with the low sheet resistances observed.

The fused metal networks can also have low haze along with high transmission of visible light while having desirably low sheet resistance. Haze can be measured using a hazemeter based on ASTM D1003 referenced above, and the haze contribution of the substrate can be removed to provide haze values of the transparent conductive film. In some embodiments, the sintered network film can have a haze value of no more than about 1.2%, in further embodiments no more than about 1.1%, in additional embodiments no more than about 1.0% and in other embodiments from about 0.9% to about 0.2%. As described in the Examples, with appropriately selected silver nanowires very low values of haze and sheet resistance have been simultaneously achieved. The loading can be adjusted to balance the sheet resistance and the haze values with very low haze values possible with still good sheet resistance values. Specifically, haze values of no more than 0.8%, and in further embodiments from about 0.4% to about 0.7%, can be achieved with values of sheet resistance of at least about 45 ohms/sq. Also, haze values of 0.7% to about 1.2%, and in some embodiments from about 0.75% to about 1.05%, can be achieved with sheet resistance values of from about 30 ohms/sq to about 45 ohms/sq. All of these films maintained good optical transparency. A person of ordinary skill in the art will recognize that additional ranges of haze within the explicit ranges above are contemplated and are within the present disclosure.

With respect to the corresponding properties of the multilayered films, the additional components are generally selected to have a small effect on the optical properties, and various coatings and substrates are commercially available for use in transparent elements. Suitable optical coatings, substrates and associated materials are summarized above. Some of the structural material can be electrically insulating, and if thicker insulating layers are used, the film can be patterned to provide locations where gaps or voids through the insulating layers can provide access and electrical contact to the otherwise embedded electrically conductive element.

Touch Sensors

Figure 3:
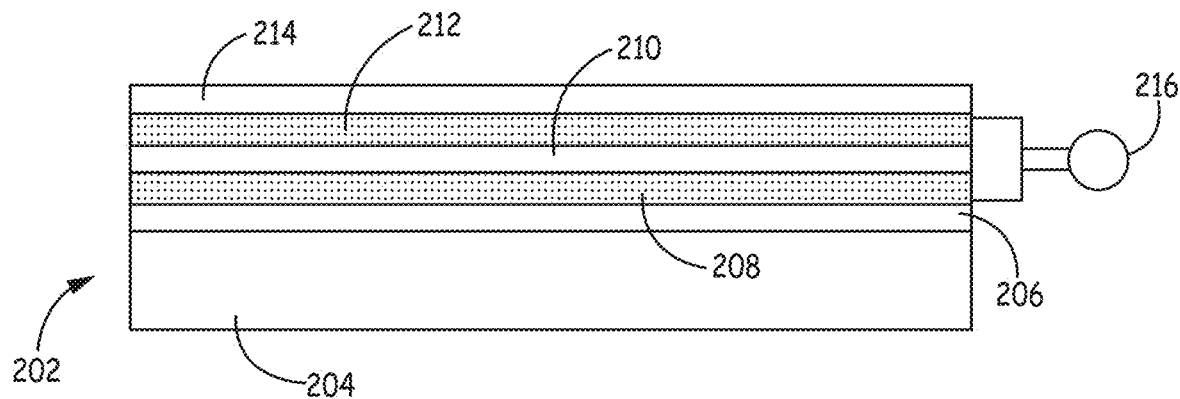
FIG. 3 is a schematic diagram showing a capacitance based touch sensor.
Figure 4:
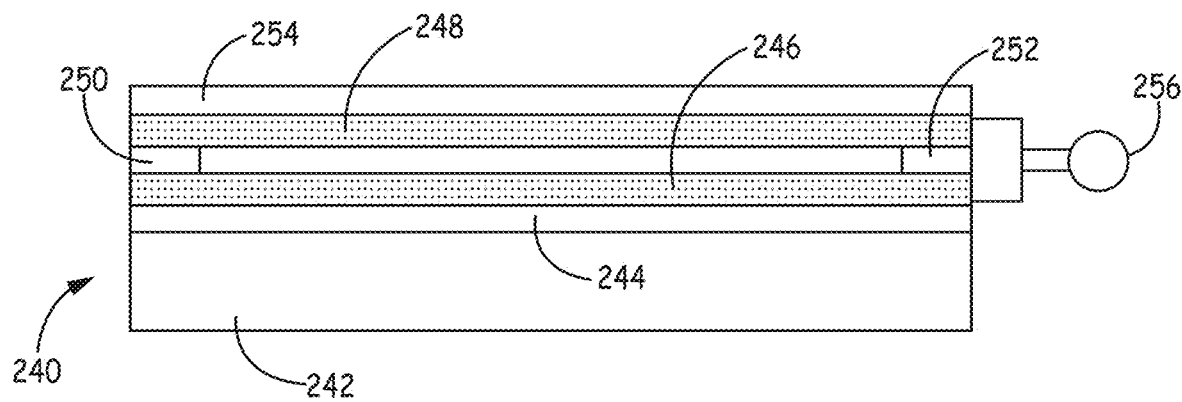
FIG. 4 is a schematic diagram showing a resistance based touch sensor.

The transparent conductive films described herein can be effectively incorporated into touch sensors that can be adapted for touch screens used for many electronic devices. Some representative embodiments are generally described here, but the transparent conductive films can be adapted for other desired designs. A common feature of the touch sensors generally is the presence of two transparent conductive electrode structures in a spaced apart configuration in a natural state, i.e., when not being touched or otherwise externally contacted. For sensors operating based on capacitance, a dielectric layer is generally between the two electrode structures. Referring to FIG. 3, a representative capacitance based touch sensor 202 comprises a display component 204, an optional bottom substrate 206, a first transparent conductive electrode structure 208, a dielectric layer 210, such as a polymer or glass sheet, a second transparent conductive electrode structure 212, optional top cover 214, and measurement circuit 216 that measures capacitance changes associated with touching of the sensor. Referring to FIG. 4, a representative resistance based touch sensor 240 comprises a display component 242, an optional lower substrate 244, a first transparent conductive electrode structure 246, a second transparent conductive electrode structure 248, support structures 250, 252 that support the spaced apart configuration of the electrode structures in their natural configuration, upper cover layer 254 and resistance measuring circuit 256.

Display components 204, 242 can be, for example, LED based displays, LCD displays or other desired display components. Substrates 206, 244 and cover layers 214, 254 can be independently transparent polymer sheets or other transparent sheets. Support structures can be formed from a dielectric material, and the sensor structures can comprise additional supports to provide a desired stable device. Measurement circuits 216, 256 are known in the art.

Transparent conductive electrodes 208, 212, 246 and 248 can be effectively formed using fused metal networks, which can be patterned appropriately to form distinct sensors, although in some embodiments the fused metal networks form some transparent electrode structures while other transparent electrode structures in the device can comprise materials such as electrically conductive metal oxides, for example indium tin oxide, aluminum doped zinc oxide, indium doped cadmium oxide, fluorine doped tin oxide, antimony doped tin oxide, or the like as thin films or particulates, carbon nanotubes, graphene, conductive organic compositions or the like. Fused metal networks can be effectively patterned as described herein, and it can be desirable for patterned films in one or more of the electrode structures to form the sensors such that the plurality of electrodes in a transparent conductive structure can be used to provide position information related to the touching process. The use of patterned transparent conductive electrodes for the formation of patterned touch sensors is described, for example, in U.S. Pat. No. 8,031,180 to Miyamoto et al., entitled "Touch Sensor, Display With Touch Sensor, and Method for Generating Position Data," and published U.S. patent application 2012/0073947 to Sakata et al., entitled "Narrow Frame Touch Input Sheet, Manufacturing Method of Same, and Conductive Sheet Used in Narrow Frame Touch Input Sheet," both of which are incorporated herein by reference.

EXAMPLES

The following examples involve the coating of loaded polymer precursor solutions onto appropriate substrate. Examples are presented with nanodiamond fillers, aluminum oxide nanoparticle fillers or zirconium oxide nanoparticle fillers. Some examples involve formation of passive coated polymer films. Other examples involve coatings associated with fused metal conductive networks that result in the formation in a transparent conductive film. For embodiments of transparent conductive films, examples are presented with the property enhancing nanoparticles in the layer with the fused metal conductive network or in a coating placed over the layer with the fused metal conductive network. The fused metal conductive network is formed using silver nanowires.

Commercial silver nanowires were used in the following examples with an average diameter of between 25 and 50 nm and an average length of 10-30 microns. The silver nanowire ink was essentially as described in Example 5 of U.S. patent application Ser. No. 14/448,504, now U.S. Pat. No. 9,183,968 to Li et al., entitled "Metal Nanowire Inks for the Formation of Transparent Conductive Films With Fused Networks," incorporated herein by reference. The metal nanowire ink comprised silver nanowires at a level between 0.01 to 0.5 wt %, between 0.01 mg/mL and 2.0 mg/mL silver ions, and a cellulose based binder at concentrations from about 0.02 to 1.0 wt %. The silver nanowire inks were aqueous solutions with a small amount of alcohol. The ink was slot coated onto a PET polyester film. After coating the nanowire inks, the films were then heated in an oven at 100° C. for 10 min to dry the films. Formation procedures for the overcoats are described below in the specific examples.

The total transmission (TT) and haze of the film samples were measured using a Haze Meter. To adjust the haze measurements for the samples below, a value of substrate haze can be subtracted from the measurements to get approximate haze measurements for the transparent conductive films alone. The instrument is designed to evaluate optical properties based on ASTM D 1003 standard ("Standard Test Method for Haze and Luminous Transmittance of Transparent Plastics"), incorporated herein by reference. The total transmission and haze of these films include PET substrate which has base total transmission and haze of ~92.9% and 0.1%-0.4%, respectively. In the following examples, several different formulations of fusing metal nanowire inks are presented along with optical and sheet resistance measurements.

Sheet resistance was measured with a 4-point probe method, a contactless resistance meter or by measuring the resistance of the film by using a square defined by two solid (non-transparent) lines of silver formed from silver paste. In some embodiments, to make sheet resistance measurements, a pair of parallel stripes of silver paste was sometime used by painting the paste onto the surface of the samples to define a square, or a rectangular shape, which were then annealed at roughly 120 ° C. for 20 minutes in order to cure and dry the silver paste. Alligator clips were connected to the silver paste stripes, and the leads were connected to a commercial resistance measurement device. Electrical connections are made to exposed end sections of the film. Some samples had sheet resistance measured by a third party vendor.

The pencil hardness of the AgNWs film samples were measured using a Pencil Test Kit. Following the pencil sharpening methodology, abrasive paper was used for pencil tip modification, and a constant downward force was applied while holding the pencil at a 45° angle and the pencil was moved across the surface of the film sample. This test used a 500 g or 750 g commercial pencil hardness kit. Hardness was determined by analyzing the effect of different pencils in the graphite grading scale on the base conductive layer. If no damage was done to the base layer, the film was considered to have passed that specific graphite level. The film was checked under a Leica microscope at a 20× magnification. The film was placed on a very flat surface, which is significant to avoid scratching by the pencil as the films are very thin. This testing differed from the corresponding standardized tests, which rely on visual examination without magnification.

The steel wool final hardness of the film samples were measured using superfine 0000 steel wool under specific weights. For some samples, steel wool, with a constant downward force provided by 20g, 50g, or 100g weights, was passed over the coated films once and the film was examined under light for detection of micro scratches. The number of scratches determine the scratch resistance of the film. No scratches made by the steel wool would mean a "pass" for that specific weight on the steel wool. In the case of not passing, the number of scratches made are indicated in the results section. For some samples, haze and/or sheet resistance was also evaluated following testing with the steel wool.

In the haze and/or sheet resistance analysis, super fine steel wool was used to rub the surface after the overcoat was applied and crosslinked. Steel wool rub was performed very gently, while keeping a constant downward force. A section of the film under test was rubbed 10 times back and forth with the steel wool. Micro scratches tend to contribute much less to the haze increase compared to deeper scratches. BYK Haze-Gard Plus was used for total transparency and haze measurements. The change in the sheet resistance was also measured by a third party service for in-house OC formulations, as described in Example 4. Haze was measured before and after the test.

Example 1

Effect of Nanodiamonds on Commercial Overcoat on a Transparent Substrate

This example tests the effect on the hardness of a commercial overcoat loaded with nanodiamonds on PET substrate with an initial polymer binder overcoat.

The substrate was prepared by coating a base ink with a cellulose based polymer binder but without any silver nanowires was coated onto a transparent PET substrate and dried. The coated substrate had a haze of 0.72%. A commercial coating polymer from Dexerials was dissolved in N,N-dimethylformamide (DMF). Six samples were prepared with two samples at each of 2 wt %, 3 wt % and 4 wt % polymer concentrations. In one sample at each polymer concentration, hydrogen terminated nanodiamonds were added, respectively, at 0.2 wt %, 0.3 wt %, or 0.4 wt % concentrations, so that in each diamond containing sample, the diamond concentrations were about one tenth the polymer concentration. The coating solutions were deposited onto the substrate by slot coating at 1 mil (25.4 microns) wet thickness. The films were then were dried with an infrared lamp and cured with UV light under nitrogen at 1 J/cm$^2$ using a Heraeus Fusion UV System (H-bulb). The solid content of the coating solution correlates with the thickness of the dried film, and the films formed with coating solutions having 0.3 wt % polymer would have an average thickness of about 75 nm. Hardness and optical properties were compared between the films formed with the nanoparticle fillers and films formed without the nanoparticle fillers. The results are shown in Table 1. In general, for the thicker dried coatings, inclusion of the nanodiamonds significantly improved the hardness with a small increase in haze.

TABLE 1

| Sample | Polymer wt % In Solution | Nanodiamonds wt % in Solution | TT % | Haze % | Pencil Hardness |
|---|---|---|---|---|---|
| 1 | 2 | 0 | 91.6 | 0.64 | <9B |
| 2 | 2 | 0.2 | 92.5 | 0.62 | <9B |
| 3 | 3 | 0 | 92.5 | 0.61 | <9B |
| 4 | 3 | 0.3 | 92.5 | 0.69 | 9B-8B |
| 5 | 4 | 0 | 92.4 | 0.59 | 8B |
| 6 | 4 | 0.4 | 91.5 | 1.00 | 5H |

Example 2

Effect of Nanodiamond in Conductive Inks

This example tests the hardness of films having a fused metal nanostructured layers with nanodiamonds incorporated into the conductive layer with a hard coating applied over the conductive layer.

A silver nanowire ink was prepared as described above except for the addition of 0.036 wt % nanodiamonds with hydrogen terminated surface in the ink. The nanodiamonds were initially dispersed in a gamma-butyrolactone solvent prior to mixing into the silver nanowire inks. The nanowire inks were slot coated onto a PET film substrate and dried to fuse the nanowires into a fused metal nanostructured network forming a conductive layer. An overcoating composition was prepared as described in Example 1 except at a polymer concentration of 0.5 wt % and without nanodiamonds. The overcoat was processed similarly as described in Example 1 with slot coating onto the dried fused metal conductive layer, drying of the coating and UV curing the coating.

Hardness and optical properties were compared between the films formed with the nanoparticle fillers in the conductive layer and films formed without the nanoparticle fillers, as shown in Table 2. Optical properties were also determined with and without the overcoat. Inclusion of the nanodiamonds in the nanowire ink significantly improved the hardness of the film with the overcoat. With the addition of the nanodiamonds, the sheet resistance increased somewhat, the total transparency decreased slightly, and the haze increased somewhat. Note that the overcoat generally though lowered the haze relative to corresponding samples without the overcoat.

TABLE 2

| Sample | Haze % | TT % | Sheet Resistance (ohms/sq) | Pencil Hardness |
|---|---|---|---|---|
| AgNW Ink | 1.11 | 92.2 | 58 | |
| AgNW Ink + Overcoat | 0.91 | 91.9 | | 2H |
| AgNW Ink with Nanodiamonds | 1.33 | 91.2 | 87 | |
| AgNW Ink with Nanodiamonds + Overcoat | 1.19 | 91.4 | | –8H |

Example 3

Effect of Nanodiamonds in Commercial Overcoats Over a Transparent Conductive Layer This example tests the hardness of transparent conductive films incorporating commercial overcoats incorporating nanodiamonds.

The silver nanowire was deposited and processed as described above. Following drying, the layer comprised fused metal nanostructured network within the sparse metal conductive layer. The sheet resistances for the conductive layers were between 50 and 60 ohms/sq., and the thin overcoat layers did not significantly change the sheet resistance of the film after applying the and curing the overcoat. Two different metal nanowire ink systems were tested in combination with 3 different commercial overcoats, three different corresponding solvent systems and three different initial nanodiamond dispersions. The substrates with the fused metal nanostructured network had an initial haze prior to application of the overcoat of 1.12% with the first ink system and 1.28% with the second ink system. Hardness and optical properties were compared between the films formed with the nanoparticle fillers and films formed without the nanoparticle fillers.

Figure 5:
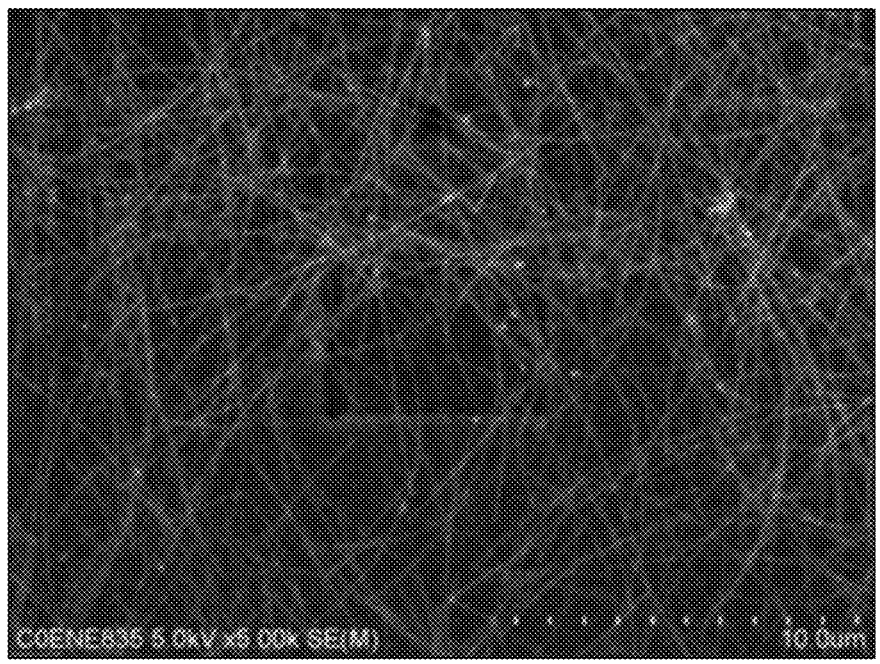
FIG. 5 is a scanning electron micrograph (SEM) of a transparent conductive film with an overcoat having 10 wt % nanodiamonds at a first magnification.
Figure 6:
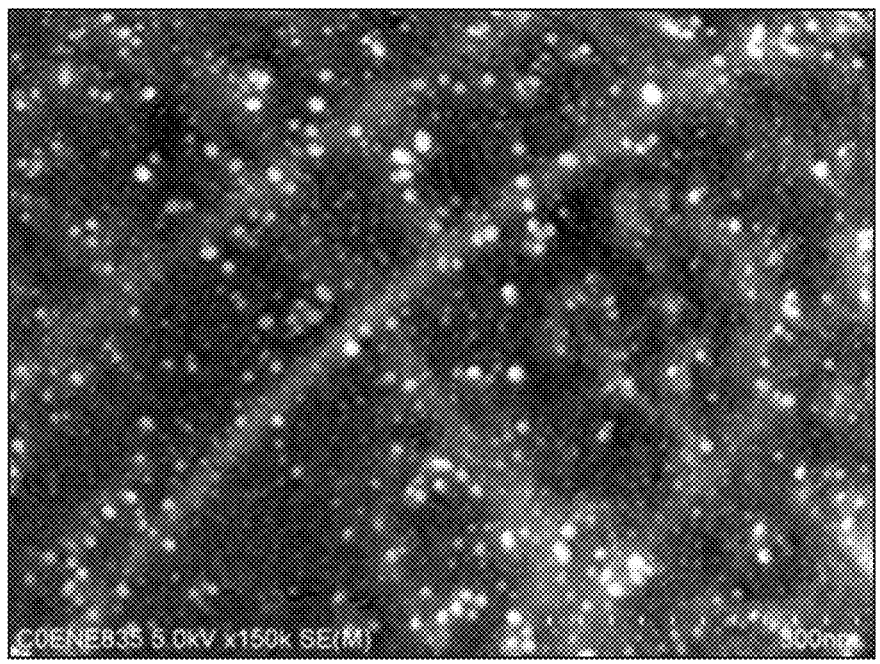
FIG. 6 is an SEM image of the transparent conductive film of FIG. 5 at a greater magnification.
Figure 7:
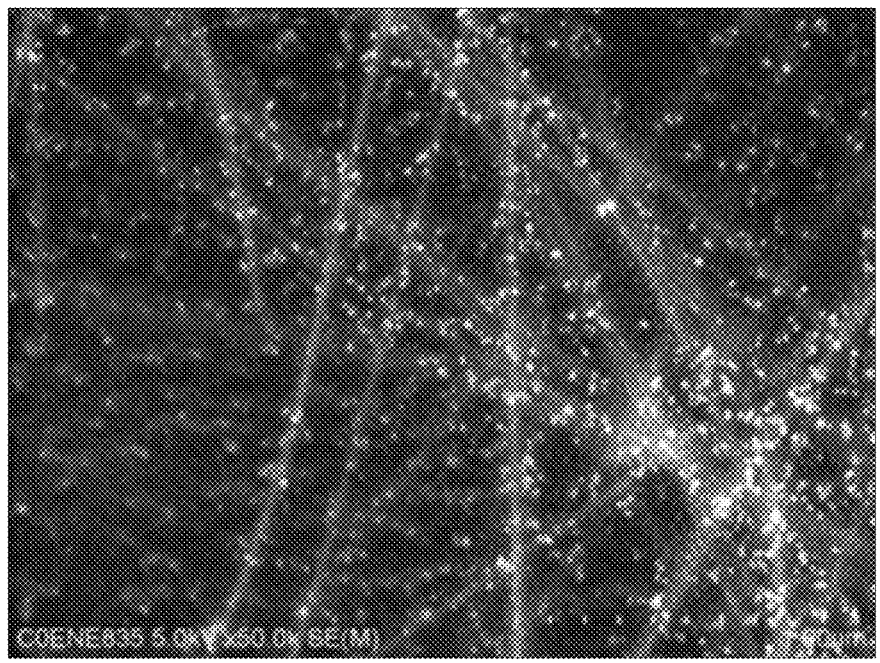
FIG. 7 is an SEM image of a transparent conductive film with an overcoat having 5 wt % nanodiamonds.
Figure 8:
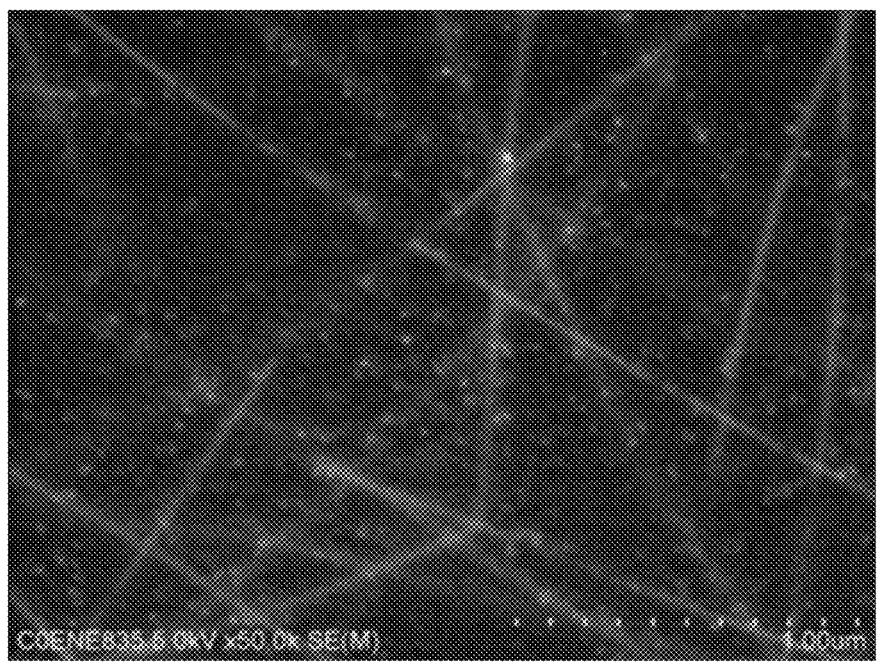
FIG. 8 is an SEM image of a transparent conductive film with an overcoat having 3 wt % nanodiamonds.

A first set of samples were prepared with the first silver nanowire ink system and an overcoat formed with a coating material from Hybrid Plastics. The coating solutions for the overcoat were formed in a formic acid solution. Four solutions were formed with two solutions having a polymer concentration of 0.5 wt % and two solutions having polymer concentrations of 0.75 wt %. Of the two solutions at each polymer concentration, one had added commercial nanodiamonds in aqueous solvent. The solutions with nanodiamond fillers had 0.05 wt % nanodiamonds for the 0.5 wt % polymer solutions and 0.075 wt % nanodiamonds for the 0.75 wt % polymer solutions. The overcoats were applies, dried and cured. Optical measurements and hardness measurements were obtained on the cured films, and the results are presented in Table 3. The haze values in Table 3 were averages across the film, while the initial haze values for the steel wool evaluation were specific values measured at the location where the steel wool was applied. As shown in Table 3, inclusion of the nanodiamonds in these films significantly improved the hardness, and corresponding experiments also demonstrated significant improvement in scratch resistance from steel wool. Representative scanning electron micrograph is shown for a 10 wt % nanodiamond film at two magnifications in FIGS. 5 and 6. For comparison, FIGS. 7 and 8 show SEM images for 5 wt % and 3 wt % nanodiamond films, respectively.

TABLE 3

| Sample | TT % | Haze % | Pencil Hardness | Steel Wool Initial Haze % | Steel Wool Final Haze % |
|---|---|---|---|---|---|
| 0.5 wt % Polymer | 91.8 | 0.83 | <9B | 0.74 | 2.22 |
| 0.5 wt % Polymer with 0.05 wt % Nanodiamonds | 91.3 | 0.84 | 3H | 0.82 | 0.83 |
| 0.75 wt % Polymer | 91.2 | 0.83 | 9B | 0.78 | 1.56 |
| 0.75 wt % Polymer with 0.075 wt % Nanodiamonds | 90.8 | 0.86 | 5H | 0.82 | 0.82 |

Two additional samples were prepared with formic acid. These solutions were prepared with a California Hardcoating Company (CHC) polymer in the coating solution. The coating solution had polymer at 0.5 wt %. One solution comprised 0.05 wt % commercial nanodiamonds in aqueous solution and the second solution did not include any nanodiamonds. The solutions were coated over a fused metal nanostructured network formed with the second silver nanowire ink system. Optical and hardness results were obtained after drying and curing, and the results are presented in Table 4. The inclusion of the nanodiamonds significantly increased hardness of the coatings and decreased the haze increase resulting from the steel wool test. The initial haze only increased slightly with the nanodiamonds and the total transmittance only decreased slightly.

TABLE 4

| Sample | TT % | Haze % | Pencil Hardness | Steel Wool Initial Haze % | Steel Wool Final Haze % |
|---|---|---|---|---|---|
| 0.5 wt % Polymer | 91.9 | 1.07 | 6B | 1.1 | 2.01 |
| 0.5 wt % Polymer with 0.05 wt % Nanodiamonds | 91.7 | 1.12 | 3H | 1.1 | 1.12 |

An additional set of 9 samples were prepared with N,N-dimethylformamide in the coating solution. The solutions covered three different polymer concentrations with a coating polymer from Dexerials, and some samples included nanodiamonds initially dispersed in ethylene glycol at corresponding concentrations in the coating solution while other solutions did not include nanodiamonds. The coatings were applied over a fused metal nanostructured network formed with the first nanowire ink solution. Optical and hardness measurements were obtained after dying and curing the overcoat, and the results are summarized in Table 5.

TABLE 5

| Sample | TT % | Haze % | Pencil Hardness | Steel Wool Initial Haze % | Steel Wool Final Haze % |
|---|---|---|---|---|---|
| 0.3 wt % Polymer | 91.7 | 0.82 | HB | 0.83 | 1.04 |
| 0.3 wt % Polymer with 0.018 wt % Nanodiamonds | 91.5 | 0.89 | 3H | 0.91 | 1 |
| 0.3 wt % Polymer with 0.03 wt % Nanodiamonds | 91.3 | 0.9 | 5H | 0.9 | 0.9 |
| 0.5 wt % Polymer | 91.5 | 0.85 | H | 0.87 | 1.02 |
| 0.5 wt % Polymer with 0.05 wt % Nanodiamonds | 91 | 0.95 | 5H | 1.01 | 1.03 |
| 0.5 wt % Polymer with 0.05 wt % Nanodiamonds | 91.2 | 0.9 | 8H | 1.04 | 1.05 |
| 0.75 wt % Polymer | 91.2 | 0.81 | 5H | 0.9 | 0.91 |
| 0.75 wt % Polymer with 0.075 wt % Nanodiamonds | 90.4 | 1.08 | 8H | 0.95 | 0.96 |
| 0.75 wt % Polymer with 0.075 wt % Nanodiamonds | 90.1 | 1.12 | 8H | 1.1 | 1.1 |

Ten further samples were prepared in non-aqueous solvent for forming the overcoats. Again, the polymer from Dexerials was used in a solvent of propylene glycol monomethyl ether (PGME) with 4.5 volume percent N,N-dimethylacetamide (DMA). All of the solutions included 0.5 wt % polymer. Three different commercial nanodiamonds were used and for each nanodiamond three different nanodiamond concentrations were used. The nanodiamonds were commercial nanodiamonds obtained as dispersions in ethylene glycol (ND-A), in dispersions of ethylene glycol with particles having hydrogen-glycol terminated surfaces (ND-H-EG) or in dispersions gamma-butyrolactone with particles having a hydrogen terminated surface (ND-H-G). The film samples were prepared as described above. Optical and hardness measurements were obtained. For these samples, a micro-scratch analysis was also performed following rubbing with the steel wool. The results are shown in Table 6. The nanoparticles significantly improved the scratch resistance of the films with modest increases in haze and decrease in total transmittance.

TABLE 6

| Sample | TT % | Haze % | Steel Wool at 20 g | Steel Wool at 50 g | Steel Wool at 100 g |
|---|---|---|---|---|---|
| Overcoat, no Nanodiamonds | 91.5 | 0.95 | 1 | 3-4 | ~10 |
| Overcoat with 0.0025 wt % ND-A | 91.4 | 1.02 | pass | pass | 2 |
| Overcoat with 0.005 wt % ND-A | 91.5 | 1.03 | pass | pass | 1 |
| Overcoat with 0.015 wt % ND-A | 91.5 | 0.97 | pass | pass | 1 |
| Overcoat with 0.0025 wt % ND-H-EG | 91.6 | 0.91 | pass | 1 | 1 |
| Overcoat with 0.005 wt % ND-H-EG | 91.3 | 1.03 | pass | pass | 1 |
| Overcoat with 0.015 wt % ND-H-EG | 91.5 | 0.96 | pass | pass | 1 |
| Overcoat with 0.0025 wt % ND-H-G | 91.6 | 0.92 | pass | pass | 1 |
| Overcoat with 0.005 wt % ND-H-G | 91.3 | 0.94 | pass | pass | pass |
| Overcoat with 0.015 wt % ND-H-G | 91.4 | 0.95 | pass | pass | pass |

Example 4

Effect of Nanodiamonds in Formulated Coating Solutions

In this example, the effectiveness of nanodiamonds to improve hardness is examined in samples of transparent conductive films with in-house formulated overcoats.

For these experiments, the substrates were prepared with a fused metal conductive layer formed with the second metal nanowire ink described in Example 3. Two different in-house coating solutions (HOC1 and HOC2) were tested. The in-house formulated coating materials included a blend of a commercial UV crosslinkable acrylate hard coating composition with a cyclic-siloxane epoxy resin. HOC1 further comprised a urethane acrylate oligomer, and HOC2 further comprised an epoxy acrylate oligomer. Epoxy acrylate hybrid hard coatings are described further, for example, in U.S. Pat. No. 4,348,462 to Chung, entitled "Abrasion Resistant Ultraviolet Light Curable Hard Coating Compositions," U.S. Pat. No. 4,623,676 to Kistner, entitled "Protective Coating for Phototools," and Sangermano et al., Macromolecular Materials and Engineering, Volume 293, pp 515-520, (2008), entitled "UV-Cured Interpenetrating Acrylic-Epoxy Polymer Networks: Preparation and Characterization," all three of which are incorporated herein by reference.

Twelve samples were prepared with two different solvent systems. Specifically, 8 samples were prepared in a 1:1 by volume mixture of N,N-dimethylformamide (DMF) and methylethylketone (MEK), and three samples were prepared in acetonitrile. Samples 1-4 were prepared with HOC1, and samples 5-12 were prepared with HOC2. Samples were prepared with two different polymer concentrations in the coating solution and three different nanodiamond concentrations. Samples 1-8 had a 0.5 wt % polymer, and samples 9-12 has 0.8 wt % polymer. For four samples, in addition to optical measurements and hardness measurements, the change in sheet resistance after applying the steel wool was also measured. The results are presented in Tables 7 (samples 1-8) and 8 (samples 9-12). The results demonstrate that the solvent had a significant effect on the coating properties. The nanodiamonds significantly improved the hardness. The inclusion of the nanodiamonds increased the haze somewhat.

TABLE 7

| Sample - Polymer | Nanodiamonds wt % | Solvent | TT % | Haze % | Steel Wool Haze % Increase | Pencil Hardness |
|---|---|---|---|---|---|---|
| 1 - HOC1 | 0.03 | DMF + MEK | 90.7 | 1.92 | 1.17 | F |
| 2 - HOC1 | 0.05 | DMF + MEK | 90.8 | 1.84 | 1.18 | B |
| 3 - HOC1 | 0.1 | DMF + MEK | 89.8 | 2.75 | 1.14 | 2H |
| 4 - HOC1 | 0.03 | acetonitrile | 91.5 | 1.59 | Coating gone | 2B |
| 5 - HOC2 | 0.03 | DMF + MEK | 90.5 | 1.35 | 1.07 | H |
| 6 - HOC2 | 0.05 | DMF + MEK | 90.7 | 1.40 | 1.12 | H |
| 7 - HOC2 | 0.1 | DMF + MEK | 89.7 | 1.52 | 1.10 | 3H |
| 8 - HOC2 | 0.03 | acetonitrile | 91.7 | 1.28 | Coating gone | 3B |

TABLE 8

| Sample | Nanodiamonds wt % | Solvent | TT % | Haze % | Steel Wool Haze % Increase | Steel Wool Resistance Change | Pencil Hardness |
|---|---|---|---|---|---|---|---|
| 9 | 0.03 | DMF + MEK | 90.4 | 1.60 | 1.17 | 1.31 | HB |
| 10 | 0.05 | DMF + MEK | 89.8 | 1.83 | 1.01 | 1.06 | H |
| 11 | 0.1 | DMF + MEK | 88 | 2.71 | 1.02 | 0.97 | 3H |
| 12 | 0.03 | acetonitrile | 91.2 | 1.56 | 1.18 | 1.33 | F |

Six samples were prepared with HOC2 based overcoat. Overall, two different solvent systems were tested and two different types of nanodiamonds. The samples were prepared as described above. The results are presented in Table 9. As with the results presented in Table 7 and 8, the hardness results were significantly dependent on the solvent system.

TABLE 9

| Sample | Nanodiamonds wt %, type | Solvent (v:v) | Pencil Hardness |
|---|---|---|---|
| 1 | 0.03, ND-H-EG | acetonitrile + DMA (95:5) | HB |

TABLE 9-continued

| Sample | Nanodiamonds wt %, type | Solvent (v:v) | Pencil Hardness |
|---|---|---|---|
| 2 | 0.05, ND-H-EG | acetonitrile + DMA (95:5) | 3H |
| 3 | 0.03, ND-H-G | acetonitrile + DMA (95:5) | 3H |
| 4 | 0.05, ND-H-G | acetonitrile + DMA (95:5) | 2H |
| 5 | 0.03, ND-H-G | Acetonitrile + PGME + DMA (48:48:4) | 4H |
| 6 | 0.05, ND-H-G | acetonitrile + PGME + DMA (48:48:4) | 6H |

Example 5

Metal Oxide Fillers

This example tests the effect on transparent conductive films with metal oxide nanoparticles in an overcoat over the sparse metal conductive layer.

The conductive layer was formed with the second silver nanowire ink as described in Example 3 above. Six well mixed coating solution samples were prepared with one of two different overcoat polymers and one of three different metal oxide nanoparticles. A first overcoat polymer was obtained from California Hardcoating Company (CHC), and the second overcoat polymer was formulated in house (HOC3) similar to the polymers described in Example 4. The metal oxide nanoparticles were aluminum oxide nanoparticles (Al2O3) from both BYK and US-Nano or zirconium oxide nanoparticles (ZrO2) from BYK. All overcoat solutions were coated, dried and cured as described above. The average size of the nanoparticles was about 20 nm to about 40 nm. The coating solutions had about 0.75 wt % polymer and about 0.09 wt % nanoparticles.

Sheet resistance (SR) and optical properties were obtained for films formed with the metal oxide nanoparticles and films formed without the metal oxide nanoparticles, and the results are presented in Table 9. In general, the inclusion of aluminum oxide nanoparticles or zirconium oxide nanoparticles did not significantly increase sheet resistance or decrease total transmittance. With zirconium oxide nanoparticles, the haze did not increase and may have slightly decreased. However, with the aluminum oxide nanoparticles the haze had a significant increase.

TABLE 10

| | | Before Overcoat | | | After Overcoat | | |
|---|---|---|---|---|---|---|---|
| Sample | Fusion | SR (Ohms/sq) | TT % | Haze % | SR (Ohms/sq) | TT % | Haze % |
| HOC3 with Al$_2$O$_3$ (BYK) | 2 passes | 59 | 91.5 | 1.09 | 65 | 91.6 | 13.7 |
| HOC3 with ZrO$_2$ (BYK) | 2 passes | 58 | 91.5 | 1.08 | 60 | 90.8 | 0.98 |
| CHC with Al$_2$O$_3$ (BYK) | 2 passes | 61 | 91.5 | 1.07 | 61 | 91.4 | 15.4 |
| CHC with ZrO$_2$ (BYK) | 2 passes | 58 | 91.5 | 1.09 | 65 | 90.2 | 1.07 |
| HOC3 with Al$_2$O$_3$ (US-Nano) | 1 pass | 62 | 90.9 | 1.34 | 59 | 90.5 | 9.4 |
| CHC with Al$_2$O$_3$ (US-Nano) | 2 passes | 43 | 91.3 | 1.32 | 45 | 90.0 | 2.7 |

The embodiments above are intended to be illustrative and not limiting. Additional embodiments are within the claims. In addition, although the present invention has been described with reference to particular embodiments, those skilled in the art will recognize that changes can be made in form and detail without departing from the spirit and scope of the invention. Any incorporation by reference of documents above is limited such that no subject matter is incorporated that is contrary to the explicit disclosure herein.

What is claimed is:

1. An optical structure comprising a transparent substrate, a transparent conductive layer and a transparent coating comprising a polymer binder and nanodiamonds wherein the transparent coating has an average thickness from about 25 nm to about 25 microns and has no more than about 10 weight percent nanodiamonds, wherein the nanodiamonds have an average particle diameter of no more than about 50 nm, wherein the haze of the optical structure increases by no more than about 1 percent relative to an equivalent optical structure without the nanodiamonds, wherein the polymer binder comprises crosslinked acrylic resin, and wherein the transparent conductive layer comprises a sparse metal conductive element and a polymer binder and wherein the transparent coating is in direct contact with the transparent conductive layer.

2. The optical structure of claim 1 wherein the transparent coating has from about 0.01 weight percent to about 10 weight percent nanodiamonds.

3. The optical structure of claim 1 wherein the transparent coating has from about 0.1 weight percent to about 10 weight percent nanodiamonds.

4. The optical structure of claim 1 wherein the transparent substrate comprises a polymer film having an average thickness from about 5 microns to 2 millimeters.

5. The optical structure of claim 1 wherein the transparent coating has an average thickness from about 100 nm to about 10 microns.

6. The optical structure of claim 1 wherein the substrate comprises polyethylene terephthalate (PET), polyethylene naphthalate (PEN), polyacrylate, poly(methyl methacrylate), polyolefin, polyvinyl chloride, fluoropolymers, polyamide, polyimide, polysulfone, polysiloxane, polyetheretherketone, polynorbornene, polyester, polystyrene, polyurethane, polyvinyl alcohol, polyvinyl acetate, acrylonitrile-butadiene-styrene copolymer, cyclic olefin polymer, cyclic olefin copolymer, polycarbonate, copolymers thereof, or blends thereof.

7. The optical structure of claim 1 wherein the polymer binder further comprises polysiloxanes, polysilsesquioxanes, polyurethanes, acrylic copolymers, cellulose ethers and esters, nitrocellulose, other water insoluble structural polysaccharides, polyethers, polyesters, polystyrene, polyimide, fluoropolymer, styrene-acrylate copolymers, styrene-butadiene copolymers, acrylonitrile butadiene styrene copolymers, polysulfides, epoxy containing polymers, copolymers thereof, or mixtures thereof.

8. The optical structure of claim 1 wherein the polymer binder comprises acrylic resin, acrylic copolymers, epoxy containing polymers, copolymers thereof, or mixtures thereof.

9. The optical structure of claim 1 wherein the nanodiamonds have an average particle diameter of no more than about 20 nm.

10. The optical structure of claim 1 wherein the transparent coating is not scratched when rubbed with superfine grade steel wool under a 50 gram weight.

11. The optical structure of claim 1 wherein the transmittance for visible light decreases by no more than about 5 percent relative to an equivalent optical structure without the nanodiamonds.

12. The optical structure of claim 1 wherein the transmittance for visible light decreases by no more than about 1 percent relative to an equivalent optical structure without the nanodiamonds.

13. The optical structure of claim 1 wherein the haze of the optical structure increases by no more than about 0.25 percent relative to an equivalent optical structure without the nanodiamonds.

14. The transparent conductive film of claim 7 wherein the sparse metal conductive element comprises a fused metal nanostructured network.

15. The optical structure of claim 1 wherein the transparent coating has a pencil hardness of at least about 1H and at least about 1 grade harder than the pencil hardness of an equivalent transparent coating without the nanodiamonds.

16. The optical structure of claim 1 wherein the optical structure has a total transmission of visible light of at least about 85%.

17. The optical structure of claim 14 wherein the optical structure has a total transmission of visible light of at least about 90%.

18. The optical structure of claim 14 wherein the optical structure has a total haze of no more than about 0.8% and a sheet resistance of no more than about 90 ohms/sq.

* * * * *

UNITED STATES PATENT AND TRADEMARK OFFICE
CERTIFICATE OF CORRECTION

PATENT NO. : 10,738,212 B2
APPLICATION NO. : 15/889594
DATED : August 11, 2020
INVENTOR(S) : Ajay Virkar, Faraz Azadi Manzour and Hua Gu Page 1 of 1

It is certified that error appears in the above-identified patent and that said Letters Patent is hereby corrected as shown below:

On the Title Page

On Page 2, Column 1, Item (51), under "Int. Cl.", Lines 6-9, delete
"*C09D 163/00* (2006.01)
*C09D 101/02* (2006.01)
*C08K 3/04* (2006.01)
*G02B 1/16* (2015.01)" and insert -- *C09D 163/00* (2006.01) --, therefor.

In the Claims

In Column 36, Claim 14, Line 16, delete "transparent conductive film" and insert -- optical structure --, therefor.

In Column 36, Claim 14, Line 16, delete "claim 7" and insert -- claim 1 --, therefor.

Signed and Sealed this
Twenty-fourth Day of November, 2020

Andrei Iancu
*Director of the United States Patent and Trademark Office*